United States Patent
Wernersson et al.

(10) Patent No.: US 11,349,542 B2
(45) Date of Patent: May 31, 2022

(54) UNEVEN FREQUENCY-DOMAIN BASIS ALLOCATION FOR TYPE II CSI ENHANCEMENTS

(71) Applicant: Telefonaktiebolaget LM Ericsson (PUBL), Stockholm (SE)

(72) Inventors: Niklas Wernersson, Kungsängen (SE); Sebastian Faxér, Stockholm (SE); Maksym Girnyk, Solna (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 0 days.

(21) Appl. No.: 17/290,026

(22) PCT Filed: Oct. 29, 2019

(86) PCT No.: PCT/SE2019/051075
§ 371 (c)(1),
(2) Date: Apr. 29, 2021

(87) PCT Pub. No.: WO2020/091671
PCT Pub. Date: May 7, 2020

(65) Prior Publication Data
US 2022/0006499 A1 Jan. 6, 2022

Related U.S. Application Data

(60) Provisional application No. 62/754,991, filed on Nov. 2, 2018.

(51) Int. Cl.
*H04B 7/06* (2006.01)
*H04B 7/0456* (2017.01)

(52) U.S. Cl.
CPC ........ *H04B 7/0626* (2013.01); *H04B 7/0478* (2013.01)

(58) Field of Classification Search
CPC ........................... H04B 7/0626; H04B 7/0478
See application file for complete search history.

(56) References Cited

U.S. PATENT DOCUMENTS

| 11,095,351 B2* | 8/2021 | Mittal | H04B 7/0478 |
| 2018/0262246 A1* | 9/2018 | Faxer | H04B 7/0617 |

(Continued)

FOREIGN PATENT DOCUMENTS

| WO | 2018 029645 A2 | 2/2018 |
| WO | 2018 029645 A3 | 2/2018 |

OTHER PUBLICATIONS

3GPP TSG RAN WG1 Meeting #94bis; Chengdu, China; Source: Huawei, HiSilicon; Title: Discussion on CSI enhancement for MU-MIMO (R1-1810103)—Oct. 8-12, 2018.

(Continued)

Primary Examiner — Jaison Joseph
(74) Attorney, Agent, or Firm — Baker Botts, LLP

(57) ABSTRACT

In certain embodiments, a method performed by a wireless device comprises estimating a channel state of a downlink channel and transmitting a CSI report for the downlink channel based on the channel state. The CSI report indicates a plurality of precoder vectors, each corresponding to a frequency sub-band of the bandwidth of the downlink channel, a precoder vector being expressed as a linear combination of spatial-domain components and frequency-domain component wherein each of the spatial-domain components is associated with a respective set of one or more frequency-domain components. The method further comprises determining for each of the spatial-domain components, the number of associated frequency domain components in the set of one or more frequency-domain components associated with the spatial-domain component; determining linear combination coefficients for each combination of spatial-domain component and associated frequency-domain com- (Continued)

---

1402
Estimating a channel state of a downlink channel.

↓

1412
Transmitting a channel state information (CSI) report for the downlink channel based on the channel state, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components and where the number of frequency-domain components associated with a first spatial-domain component is larger than the number of frequency-domain components associated with a second spatial-domain component.

ponents; and including an indication of the determined linear combination coefficients as part of the CSI report.

20 Claims, 15 Drawing Sheets

(56) References Cited

U.S. PATENT DOCUMENTS

2020/0028555 A1* 1/2020 Rahman ............... H04B 7/0626
2020/0322012 A1* 10/2020 Wernersson ......... H04B 7/0626
2022/0006499 A1* 1/2022 Wernersson ......... H04B 7/0478

OTHER PUBLICATIONS

3GPP TSG RAN WG1 Meeting #94b; Chengdu, China; Source: Samsung; Title: CSI enhancement for MU-MIMO (R1-1810884)—Oct. 8-12, 2018.
3GPP TSG-RAN WG1 Meeting #94bis; Chengdu, China; Source: Ericsson; Title: On CSI enhancements for MU-MIMO support (Tdoc R1-1811193)—Oct. 8-12, 2018.
PCT International Search Report issued for International application No. PCT/SE2019/051075—dated Dec. 10, 2019.
PCT Written Opinion of the International Searching Authority issued for International application No. PCT/SE2019/051075—dated Dec. 10, 2019.

* cited by examiner ing in so-called channel dependent precoding. This is also referred to as closed-loop precoding and essentially strives to focus the transmit energy into a subspace that is strong in the sense of conveying much of the transmitted energy to the user equipment (UE).

UNEVEN FREQUENCY-DOMAIN BASIS ALLOCATION FOR TYPE II CSI ENHANCEMENTS

PRIORITY

This nonprovisional application is a U.S. National Stage Filing under 35 U.S.C. § 371 of International Patent Application Serial No. PCT/SE2019/051075 filed Oct. 29, 2019 and entitled "Uneven Frequency-Domain Basis Allocation for Type II CSI Enhancements" which claims priority to U.S. Provisional Patent Application No. 62/754,991 filed Nov. 2, 2018 both of which are hereby incorporated by reference in their entirety.

TECHNICAL FIELD

The present disclosure relates, in general, to wireless communications and, more particularly, to uneven frequency-domain basis allocation for Type II channel state information (CSI) enhancements.

BACKGROUND

Multi-antenna techniques can significantly increase the data rates and reliability of a wireless communication system. Equipping both the transmitter and the receiver with multiple antennas results in a multiple-input multiple-output (MIMO) communication channel that improves performance. Such systems and/or related techniques are commonly referred to as MIMO.

The New Radio (NR) standard is currently evolving with enhanced MIMO support. A core component in NR is the support of MIMO antenna deployments and MIMO-related techniques, such as spatial multiplexing. The spatial-multiplexing mode aims for high data rates in favorable channel conditions.

FIG. 1 illustrates a transmission structure of precoded spatial multiplexing mode in NR. In the spatial multiplexing operation depicted in FIG. 1, the information carrying symbol vector s is multiplied by an $N_T \times r$ precoder matrix W, which serves to distribute the transmit energy in a subspace of the $N_T$ (corresponding to $N_T$ antenna ports) dimensional vector space. The precoder matrix is typically selected from a codebook of possible precoder matrices. The precoder matrix is typically indicated by means of a precoder matrix indicator (PMI), which specifies a unique precoder matrix in the codebook for a given number of symbol streams. The transmission rank (r) symbols in symbol vector s each correspond to a layer. In this way, spatial multiplexing is achieved since multiple symbols can be transmitted simultaneously over the same time/frequency resource element (TFRE). The number of symbols r is typically adapted to suit the current channel properties.

NR uses orthogonal frequency division multiplexing (OFDM) in the downlink (DL) and discrete Fourier transform (DFT) precoded OFDM in the uplink (UL). Hence, the received $N_R \times 1$ vector $y_n$ for a certain TFRE on subcarrier n (or alternatively data TFRE number n) is thus modeled by:

$$y_n = H_n W s_n + e_n$$

where $e_n$ is a noise/interference vector obtained as realizations of a random process. The precoder W can be a wideband precoder, which is constant over frequency, or precoder W can be frequency selective.

The precoder matrix W is often chosen to match the characteristics of the $N_R \times N_T$ MIMO channel matrix $H_n$, In closed-loop precoding for the $N_R$ DL, the UE transmits recommendations to the base station (e.g., a gNodeB (gNB) in NR) of a suitable precoder to use. The UE bases these recommendations on channel measurements in the forward link (DL). In the case of NR, the gNB configures the UE to provide feedback according to CSI-ReportConfig. The gNB may transmit channel state information reference signals (CSI-RS) and may configure the UE to use measurements of CSI-RS to feed back recommended precoding matrices that the UE selects from a codebook. A single precoder that is supposed to cover a large bandwidth (wideband precoding) may be fed back. It may also be beneficial to match the frequency variations of the channel and instead feed back a frequency-selective precoding report (e.g., several precoders, one per sub-band). This is an example of the more general case of channel state information (CSI) feedback, which also encompasses feeding back other information than recommended precoders to assist the gNB in subsequent transmissions to the UE. Such other information may include channel quality indicators (CQIs) as well as transmission rank indicator (RI). In NR, CSI feedback can be either wideband, where one CSI is reported for the entire channel bandwidth, or frequency-selective, where one CSI is reported for each sub-band, which is defined as a number of contiguous resource blocks (RBs). Currently in NR, a sub-band ranges between 4 and 32 physical resource blocks (PRBs), depending on the bandwidth part (BWP) size, but generally a sub-band can comprise any amount of PRBs.

Given the CSI feedback from the UE, the gNB determines the transmission parameters it wishes to use to transmit to the UE, including the precoding matrix, transmission rank, and modulation and coding scheme (MCS). These transmission parameters may differ from the recommendations that the UE makes. The number of columns of the precoder W reflects the transmission rank, and thus the number of spatially multiplexed layers. For efficient performance, it is important to select a transmission rank that matches the channel properties.

Two-Dimensional Antenna Arrays

Two-dimensional antenna arrays may be (partly) described by the number of antenna columns corresponding to the horizontal dimension $N_h$, the number of antenna rows corresponding to the vertical dimension $N_v$, and the number of dimensions corresponding to different polarizations $N_p$. The total number of antennas is thus $N=N_h N_v N_p$. Note that the concept of an antenna is non-limiting in the sense that it can refer to any virtualization (e.g., linear mapping) of the physical antenna elements. For example, pairs of physical sub-elements could be fed the same signal, and hence share the same virtualized antenna port.

FIG. 2 illustrates a two-dimensional antenna array of cross-polarized antenna elements. More particularly, FIG. 2 illustrates an example of a 4×4 antenna array with cross-polarized antenna elements. In the example of FIG. 2, the two-dimensional antenna array of cross-polarized antenna elements ($N_p=2$) has $N_h=4$ horizontal antenna elements and $N_v=4$ vertical antenna elements.

Precoding may be interpreted as multiplying the signal with different beamforming weights for each antenna prior to transmission. One approach is to tailor the precoder to the antenna form factor (i.e., taking into account $N_h$, $N_v$ and $N_p$ when designing the precoder codebook).

Channel State Information Reference Signals (CSI-RS)

For CSI measurement and feedback, CSI-RS are defined. A CSI-RS is transmitted on each transmit antenna (or antenna port) and is used by a UE to measure the DL channel between each of the transmit antenna ports and each of its receive antenna ports. The antenna ports are also referred to as CSI-RS ports. The number of antenna ports currently supported in NR are {1,2,4,8,12,16,24,32}. By measuring the received CSI-RS, a UE can estimate the channel that the CSI-RS is traversing, including the radio propagation channel and antenna gains. The CSI-RS for the above purpose is also referred to as Non-Zero Power (NZP) CSI-RS.

CSI-RS can be configured to be transmitted in certain slots and in certain resource elements (REs) in a slot.

FIG. 3 illustrates an example of RE allocation for a 12-port CSI-RS in NR. In the example of CSI-RS REs for 12 antenna ports illustrated in FIG. 3, one RE per RB per port is shown.

In addition, an interference measurement resource (IMR) is also defined in NR for a UE to measure interference. An IMR contains 4 REs, either 4 adjacent RE in frequency in the same OFDM symbol or 2 by 2 adjacent REs in both time and frequency in a slot. By measuring both the channel based on NZP CSI-RS and the interference based on an IMR, a UE can estimate the effective channel and noise plus interference to determine the CSI (i.e., rank, precoding matrix, and the channel quality).

Furthermore, a UE in NR may be configured to measure interference based on one or multiple NZP CSI-RS resources.

CSI Framework in NR

In NR, a UE can be configured with multiple CSI reporting settings and multiple CSI-RS resource settings. Each resource setting can contain multiple resource sets, and each resource set can contain up to 8 CSI-RS resources. For each CSI reporting setting, a UE feeds back a CSI report. Each CSI reporting setting may contain some or all of the following information: a CSI-RS resource set for channel measurement; an IMR resource set for interference measurement; a CSI-RS resource set for interference measurement; time-domain behavior (i.e., periodic, semi-persistent, or aperiodic reporting); frequency granularity (i.e., wideband or sub-band); CSI parameters to be reported such as RI, PMI, CQI, and CSI-RS resource indicator (CRI) in case of multiple CSI-RS resources in a resource set; codebook types (i.e., Type I or Type II); codebook subset restriction; measurement restriction; and sub-band size. With respect to sub-band size, one out of two possible sub-band sizes is indicated. The value range depends on the bandwidth of the BWP. One CQI/PMI (if configured for sub-band reporting) is fed back per sub-band.

When the CSI-RS resource set in a CSI reporting setting contains multiple CSI-RS resources, one of the CSI-RS resources is selected by a UE and a CSI-RS Resource Indicator (CRI) is also reported by the UE to indicate to the gNB about the selected CSI-RS resource in the resource set, together with RI, PMI and CQI associated with the selected CSI-RS resource.

For aperiodic CSI reporting in NR, more than one CSI reporting setting, each with a different CSI-RS resource set for channel measurement and/or resource set for interference measurement can be configured and triggered at the same time. In this case, multiple CSI reports are aggregated and sent from the UE to the gNB in a single Physical Uplink Shared Channel (PUSCH).

DFT-Based Precoders

One type of precoding uses a DFT-precoder, where the precoder vector used to precode a single-layer transmission using a single-polarized uniform linear array (ULA) with N antennas is defined as:

$$w_{1D}(k) = \frac{1}{\sqrt{N}} \begin{bmatrix} e^{j2\pi \cdot 0 \cdot \frac{k}{QN}} \\ e^{j2\pi \cdot 1 \cdot \frac{k}{QN}} \\ \vdots \\ e^{j2\pi \cdot (N-1) \cdot \frac{k}{QN}} \end{bmatrix},$$

where k=0,1, ... QN−1 is the precoder index and Q is an integer oversampling factor. A corresponding precoder vector for a two-dimensional uniform planar array (UPA) can be created by taking the Kronecker product of two precoder vectors as:

$$w_{2D}(k,l) = w_{1D}(k) \otimes w_{1D}(l).$$

Extending the precoder for a dual-polarized UPA may then be done as:

$$w_{2D,DP}(k, l, \phi) = \begin{bmatrix} 1 \\ e^{j\phi} \end{bmatrix} \otimes$$

$$w_{2D}(k, l) = \begin{bmatrix} w_{2D}(k, l) \\ e^{j\phi} w_{2D}(k, l) \end{bmatrix} = \begin{bmatrix} w_{2D}(k, l) & 0 \\ 0 & w_{2D}(k, l) \end{bmatrix} \begin{bmatrix} 1 \\ e^{j\phi} \end{bmatrix},$$

where $e^{j\phi}$ is a co-phasing factor that may, for instance, be selected from Quadrature Phase Shift Keying (QPSK) alphabet $\phi \in$ $$\left\{0, \frac{\pi}{2}, \pi, \frac{3\pi}{2}\right\}.$$

A precoder matrix $W_{2D,DP}$ for multi-layer transmission may be created by appending columns of DFT precoder vectors as:

$$W_{2D,DP} = [w_{2D,DP}(k_1, l_1, \phi 1) w_{2D,DP}(k_2, l_2, \phi_2) \ldots w_{2D,DP}(k_R, l_R, \phi_R)],$$

where R is the number of transmission layers (i.e., the transmission rank). In a special case for a rank-2 DFT precoder, $k_1 = k_2 = k$ and $l_1 = l_2 = l$, meaning that:

$$W_{2D,DP} = [W_{2D,DP}(k, l, \phi_1)$$

$$w_{2D,DP}(k, l, \phi_2)] = \begin{bmatrix} w_{2D}(k, l) & 0 \\ 0 & w_{2D}(k, l) \end{bmatrix} \begin{bmatrix} 1 & 1 \\ e^{j\phi_1} & e^{j\phi_2} \end{bmatrix}.$$

Such DFT-based precoders are used, for example, in $N_R$ Type I CSI feedback.

Multi-User MIMO (MU-MIMO)

With MU-MIMO, two or more users in the same cell are co-scheduled on the same time-frequency resource. That is, two or more independent data streams are transmitted to different UEs at the same time, and the spatial domain is used to separate the respective streams. By transmitting several streams simultaneously, the capacity of the system can be increased. This, however, comes at the cost of reducing the signal-to-interference-plus-noise ratio (SINR)

per stream, as the power must be shared between streams and the streams will cause interference to each-other.

Multi-Beam (Linear Combination) Precoders

One central part of MU-MIMO is obtaining accurate CSI that enables nullforming between co-scheduled users. Therefore, support has been added in Long Term Evolution (LTE) Release 14 (Rel-14) and NR Release 15 (Rel-15) for codebooks that provide more detailed CSI than the traditional single DFT-beam precoders. These codebooks are referred to as Advanced CSI (in LTE) or Type II codebooks (in NR) and can be described as a set of precoders where each precoder is created from multiple DFT beams. A multi-beam precoder may be defined as a linear combination of several DFT precoder vectors as:

$$w = \sum_i c_i \cdot w_{2D,DP}(k_i, l_i, \phi_i),$$

where $\{c_i\}$ may be general complex coefficients. Such a multi-beam precoder may more accurately describe the UE's channel and may thus bring an additional performance benefit compared to a DFT precoder, especially for MU-MIMO where rich channel knowledge is desirable in order to perform nullforming between co-scheduled UEs.

NR Rel-15

For the NR Type II codebook in Rel-15, the precoding vector for each layer and sub-band is expressed in 3$^{rd}$ Generation Partnership Project (3GPP) TS 38.214, version 15.3.0, as:

$$w^l_{q_1,q_2,n_1,n_2,p_l^{(1)},p_l^{(2)},c_l} = \frac{1}{\sqrt{N_1 N_2 \sum_{i=0}^{2L-1}(p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix} \quad l=1,2$$

$p_{l,i}^{(1)}$ is a wideband amplitude parameter (or coefficient), and $p_{l,i}^{(2)}$ is a sub-band amplitude parameter (or coefficient). By restructuring the above formula and expressing it more simply, the precoder vector $w_{l,p}(k)$ can be formed for a certain layer l=0,1, polarization p=0,1 and resource block k=0, ..., $N_{RB}-1$, as:

$$w_{L,p}(k) = \frac{1}{C} \sum_{i=0}^{L-1} v_i p_{l,i}^{(1)} c_{l,i}(k)$$

where $$c_{l,i}(k) = p_{l,i}^{(2)}\left(\left\lfloor\frac{k}{s}\right\rfloor\right)\varphi_{l,i}\left(\left\lfloor\frac{k}{s}\right\rfloor\right)$$

for p=0 and $$c_{l,i}(k) = p_{l,L+i}^{(2)}\left(\left\lfloor\frac{k}{s}\right\rfloor\right)\varphi_{l,L+i}\left(\left\lfloor\frac{k}{s}\right\rfloor\right)$$

for p=1, S is the sub-band size and $N_{SB}$ is the number of sub-bands in the CSI reporting bandwidth. Hence, the change in a beam coefficient across frequency $c_{l,i}(k)$ is determined based on the $2N_{SB}$ parameters $p_{l,i}^{(2)}(0), \ldots p_{l,i}^{(2)}(N_{SB}-1)$ and $q_{l,i}(0), \ldots q_{l,i}(N_{SB}-1)$, where the sub-band amplitude parameter $p_{l,i}^{(2)}$ is quantized using 0-1 bit and the sub-band phase parameter $\phi_{l,i}$ is quantized using 2-3 bits, depending on codebook configuration.

Type II Overhead Reduction for NR Release 16 (Rel-16)

The Type II CSI feedback performance and overhead is sensitive to the sub-band size. The optimal Type II CSI beam coefficients can vary quite rapidly over frequency, and hence the more averaging that is performed (i.e., the larger the sub-band size), the more reduction in MU-MIMO performance can be expected. Operation with Type II CSI is typically compared against reciprocity-based operation, where subcarrier-level CSI can be obtained via SRS sounding. In the NR CSI reporting procedure, there are two possible CSI sub-band sizes defined for sub-band based CSI reporting for each number of PRBs of the BWP (i.e. the BWP bandwidth) and the gNB configures which of the two sub-band sizes to use as part of the CSI reporting configuration. For a 10 MHz bandwidth using 15 kHz subcarrier spacing (SCS), which is a typical LTE configuration, NR features either seven 1.44 MHz sub-bands or thirteen 720 kHz sub-bands. However, for 100 MHz bandwidth using 30 kHz SCS, a typical NR configuration, NR features either nine 11.52 MHz sub-bands or eighteen 5.76 MHz sub-bands. Such large sub-band sizes could result in poor CSI quality.

NR Rel-16 Type II considers overhead reductions. The rationale is that it has been observed that there is a strong correlation between different values of $c_{l,i}(k)$, for different values of k, and this correlation could be exploited to perform efficient compression of the information in order to reduce the number of bits required to represent the information. This would lower the amount of information that needs to be signaled from the UE to the gNB, which is relevant from several aspects. Both lossy (implying a potentially decreased level of quality in the CSI) as well as lossless compression may be considered.

In the case of lossy compression, there are many ways to parametrize the beam coefficients over frequency to achieve an appropriate CSI quality vs. overhead trade-off. By keeping the basic structure of the precoder as described above, one may update the expression for $c_{l,i}(k)$. More generally, one can describe $c_{l,i}(k)$ as a function $f(k, a_0, \ldots, a_{M-1})$ that is based on the M parameters $a_0, a_{M-1}$, where these M parameters in turn are represented using a number of bits that can be fed back as part of the CSI report.

As an example, consider the special case where $f(k, a_0, \ldots, a_{M-1})$ constitutes a linear transformation. In this case, the function can be expressed by using a transformation matrix:

$$B = \begin{bmatrix} b_{0,0} & \cdots & b_{0,K} \\ \vdots & \ddots & \vdots \\ b_{N_{RB},0} & \cdots & b_{N_{RB},K} \end{bmatrix} = [b_0 \ldots b_K],$$

consisting of K number of $N_{RB} \times 1$ sized basis vectors along with a coefficient vector:

$$a = \begin{bmatrix} a_0 \\ \cdots \\ a_{K-1} \end{bmatrix}$$

Here, $N_{RB}$ is the number of RBs in the CSI reporting bandwidth. Other granularities and units of the basis vectors can also be considered, such as the number of sub-bands $N_{SB}$, a subcarrier level granularity with $12N_{RB} \times 1$ size basis vectors, or a number of RBs.

For instance, the M parameters can be split up into a parameter I, selecting the K basis vectors from a set of basis vector candidates, and the coefficients $a_0, \ldots, a_{K-1}$. That is, some index parameter I determines the basis matrix B, for instance, by selecting columns from a wider matrix or by some other way. The beam coefficients may then be expressed as:

$$c_{l,i}(k) = f(k, I, a_0, \ldots, a_{K-1}) = [B]_{k,:} a = \sum_{d=0}^{K-1} b_{k,d} a_d.$$

That is, by forming a vector with all the beam coefficients (for a beam) such as:

$$c_{l,i} = \begin{bmatrix} c_{l,i}(0) \\ \ldots \\ c_{l,i}(N_{RB}-1) \end{bmatrix},$$

that vector can be expressed as a linear transformation:

$$c_{l,i} = B a_i.$$

In fact, the entire precoder can be expressed using matrix formulation, which is good for illustrative purposes. The beam coefficients for all the beams i and resource blocks k can be stacked into a matrix:

$$C_F = \begin{bmatrix} c_{l,0}^T \\ \ldots \\ c_{l,2L-1}^T \end{bmatrix},$$

which then can be expressed as:

$$C_F = \begin{bmatrix} c_{l,0}^T \\ \ldots \\ c_{l,2L-1}^T \end{bmatrix} = \begin{bmatrix} a_0^T B^T \\ \ldots \\ a_{2L-1}^T B^T \end{bmatrix} = \begin{bmatrix} a_0^T \\ \ldots \\ a_{2L-1}^T \end{bmatrix} B^T = \tilde{C}_F B^T.$$

The linear combination of beam basis vectors and beam coefficients can also be expressed as a matrix product. This implies that the precoders (for all RBs) for a certain layer can be expressed as a matrix product:

$$W_F = W_1 C_F = W_1 \tilde{C}_F B^T$$

That is, a spatial linear transformation (from antenna domain to beam domain) is applied from the left by multiplication of $W_1$ and from the right a frequency linear transformation by multiplication of $B^T$. The precoders are then expressed more sparsely using a smaller coefficient matrix $\tilde{C}_F$ in this transformed domain.

FIG. 4 illustrates a matrix representation of the Type II overhead reduction scheme described above, where examples of the dimensions of the matrix components of the precoder are illustrated.

There currently exist certain challenges. For example, Type II precoder schemes may lead to better MU-MIMO performance, but at the cost of increased CSI feedback overhead and UE precoder search complexity. It is an open problem of how an efficient Type II codebook that results in good MU-MIMO performance, but low feedback overhead, should be constructed as well as how the CSI feedback should be derived by the UE. As another example, it is an open issue how to support higher rank representations for Type II feedback. One problem is that the feedback overhead increases with the number of layers, which makes a high layer representation infeasible.

SUMMARY

To address the foregoing problems with existing approaches, disclosed is a method performed by a wireless device. The method comprises estimating a channel state of a downlink channel and transmitting a CSI report for the downlink channel based on the channel state. The CSI report indicates a plurality of precoder vectors. Each of the precoder vectors corresponds to a frequency sub-band of the bandwidth of the downlink channel. A precoder vector is expressed as a linear combination of spatial-domain components and frequency-domain components. Each of the spatial-domain components is associated with a respective set of one or more frequency-domain components. The number of frequency-domain components associated with a first spatial-domain component is larger than the number of frequency-domain components associated with a second spatial-domain component. The method further comprises determining, for each of the spatial-domain components, the number of associated frequency domain components in the set of one or more frequency-domain components associated with the spatial-domain component; determining linear combination coefficients for each combination of spatial-domain component and associated frequency-domain components; and including an indication of the determined linear combination coefficients as part of the CSI report.

In certain embodiments, the number of linear combination coefficients included in the CSI report for the first spatial-domain component is larger than the number of linear combination coefficients included in the CSI report for the second spatial-domain component.

In certain embodiments, the CSI report further comprises an indication of the number of associated frequency-domain components for each spatial-domain component.

In certain embodiments, the CSI report further comprises an indication of the associated frequency-domain components for each of the spatial-domain components.

In certain embodiments, a determined amplitude coefficient associated with the first spatial-domain component is larger than or equal to a determined amplitude coefficient associated with the second spatial-domain component.

In certain embodiments, the indication of the number of associated frequency-domain components for each of the spatial-domain components is jointly encoded with an indication of a selection of frequency-domain components.

Also disclosed is a computer program, the computer program comprising instructions configured to perform the above-described method in a wireless device.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a wireless device.

Also disclosed is a wireless device comprising power supply circuitry configured to supply power to the wireless device and processing circuitry configured to perform the above-described method in a wireless device. For example, the processing circuitry is configured to estimate a channel state of a downlink channel and to transmit a CSI report for the downlink channel based on the channel state. The CSI report indicates a plurality of precoder vectors. Each of the precoder vectors corresponds to a frequency sub-band of the bandwidth of the downlink channel, a precoder vector being expressed as a linear combination of spatial-domain components and frequency-domain components. Each of the spatial-domain components is associated with a respective set of one or more frequency-domain components. The number of frequency-domain components associated with a first spatial-domain component is larger than the number of frequency-domain components associated with a second spatial-domain component. The processing circuitry is further configured to determine, for each of the spatial-domain components, the number of associated frequency domain components in the set of one or more frequency-domain components associated with the spatial-domain component; determine linear combination coefficients for each combination of spatial-domain component and associated frequency-domain components; and include an indication of the determined linear combination coefficients as part of the CSI report.

Also disclosed is a method performed by a base station. The method comprises receiving a CSI report for a downlink channel. The CSI report indicates a plurality of precoder vectors. Each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components and where the number of frequency-domain components associated with a first spatial-domain component is larger than the number of frequency-domain components associated with a second spatial-domain component. The received CSI report includes an indication of linear combination coefficients for each combination of spatial-domain component and associated frequency-domain components. The method further comprises determining precoding to use for transmitting data to a wireless device based at least in part on the CSI report and transmitting data to the wireless device according to the precoding.

In certain embodiments, the number of linear combination coefficients received in the CSI report for the first spatial-domain component is larger than the number of linear combination coefficients received in the CSI report for the second spatial-domain component.

In certain embodiments, the CSI report further comprises an indication of the number of associated frequency-domain components for each spatial-domain component.

In certain embodiments, the CSI report further comprises an indication of the associated frequency-domain components for each of the spatial-domain components.

In certain embodiments, an amplitude coefficient associated with the first spatial-domain component is larger than or equal to an amplitude coefficient associated with the second spatial-domain component.

In certain embodiments, the indication of the number of associated frequency-domain components for each of the spatial-domain components is jointly encoded with an indication of a selection of frequency-domain components.

Also disclosed is a computer program, the computer program comprising instructions configured to perform the above-described method in a base station.

Also disclosed is a computer program product, the computer program product comprising a non-transitory computer-readable storage medium, the non-transitory computer-readable storage medium comprising a computer program comprising computer-executable instructions which, when executed on a processor, are configured to perform the above-described method in a base station.

Also disclosed is a base station comprising power supply circuitry configured to supply power to the base station and processing circuitry configured to perform the above-described method in a base station. For example, the processing circuitry is configured to receive a CSI report for a downlink channel. The CSI report indicates a plurality of precoder vectors. Each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components and where the number of frequency-domain components associated with a first spatial-domain component is larger than the number of frequency-domain components associated with a second spatial-domain component. The received CSI report includes an indication of linear combination coefficients for each combination of spatial-domain component and associated frequency-domain components. The processing circuitry is further configured to determine precoding to use for transmitting data to a wireless device based at least in part on the CSI report and to transmit data to the wireless device according to the precoding.

Certain embodiments of the present disclosure may provide one or more technical advantages. As one example, certain embodiments may advantageously allow for increased MU-MIMO performance by having rich precoder feedback with reasonable feedback overhead. Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which.

DETAILED DESCRIPTION

Figure 1:
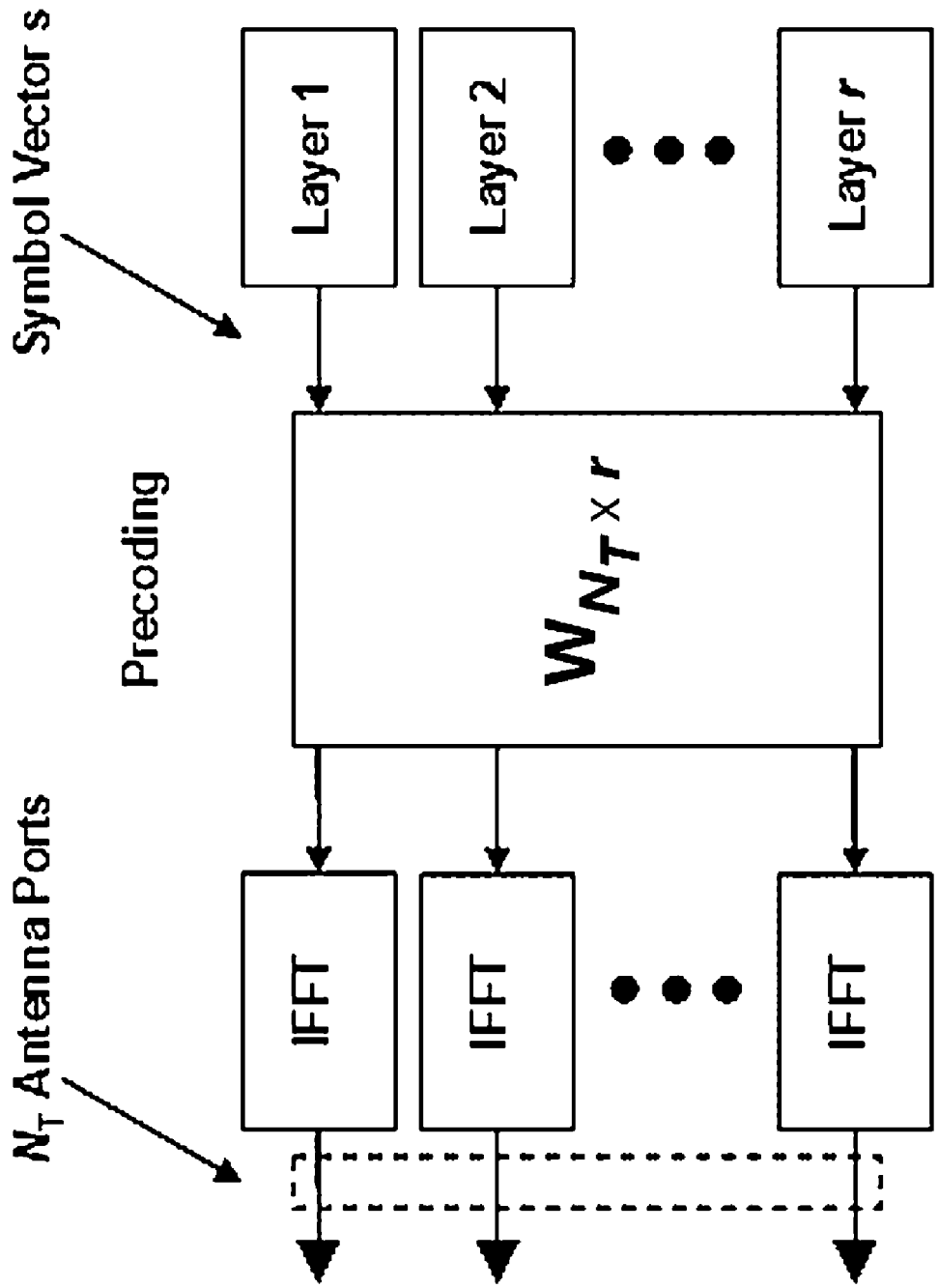
FIG. 1 illustrates a transmission structure of precoded spatial multiplexing mode in NR, in accordance with certain embodiments.
Figure 2:
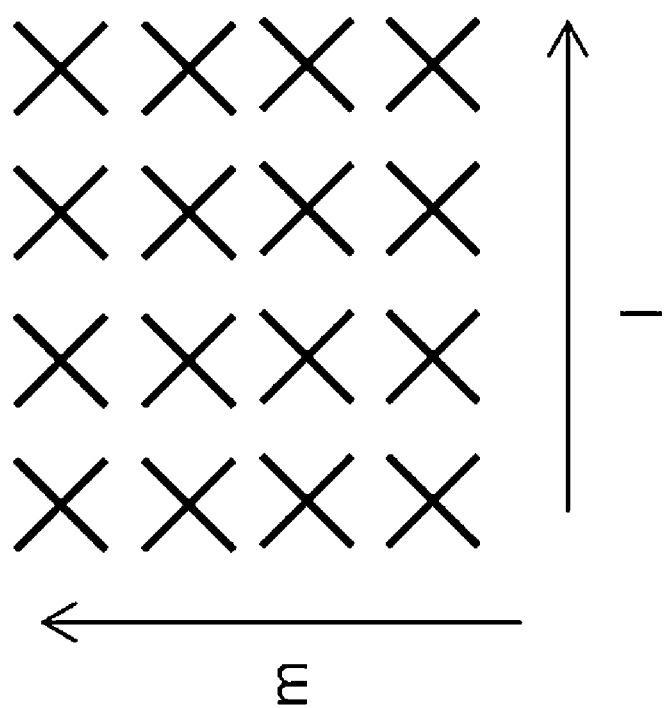
FIG. 2 illustrates a two-dimensional antenna array of cross-polarized antenna elements, in accordance with certain embodiments.
Figure 3:
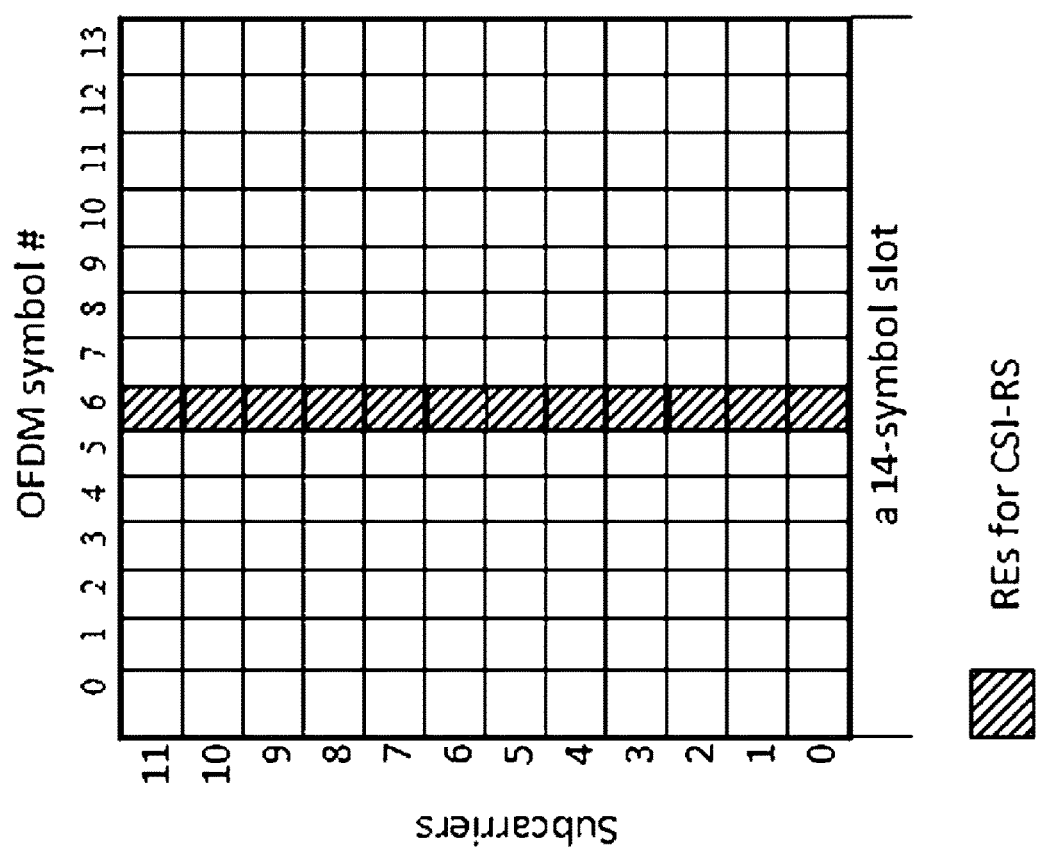
FIG. 3 illustrates an example of resource element allocation for a 12-port CSI-RS in NR, in accordance with certain embodiments.
Figure 4:
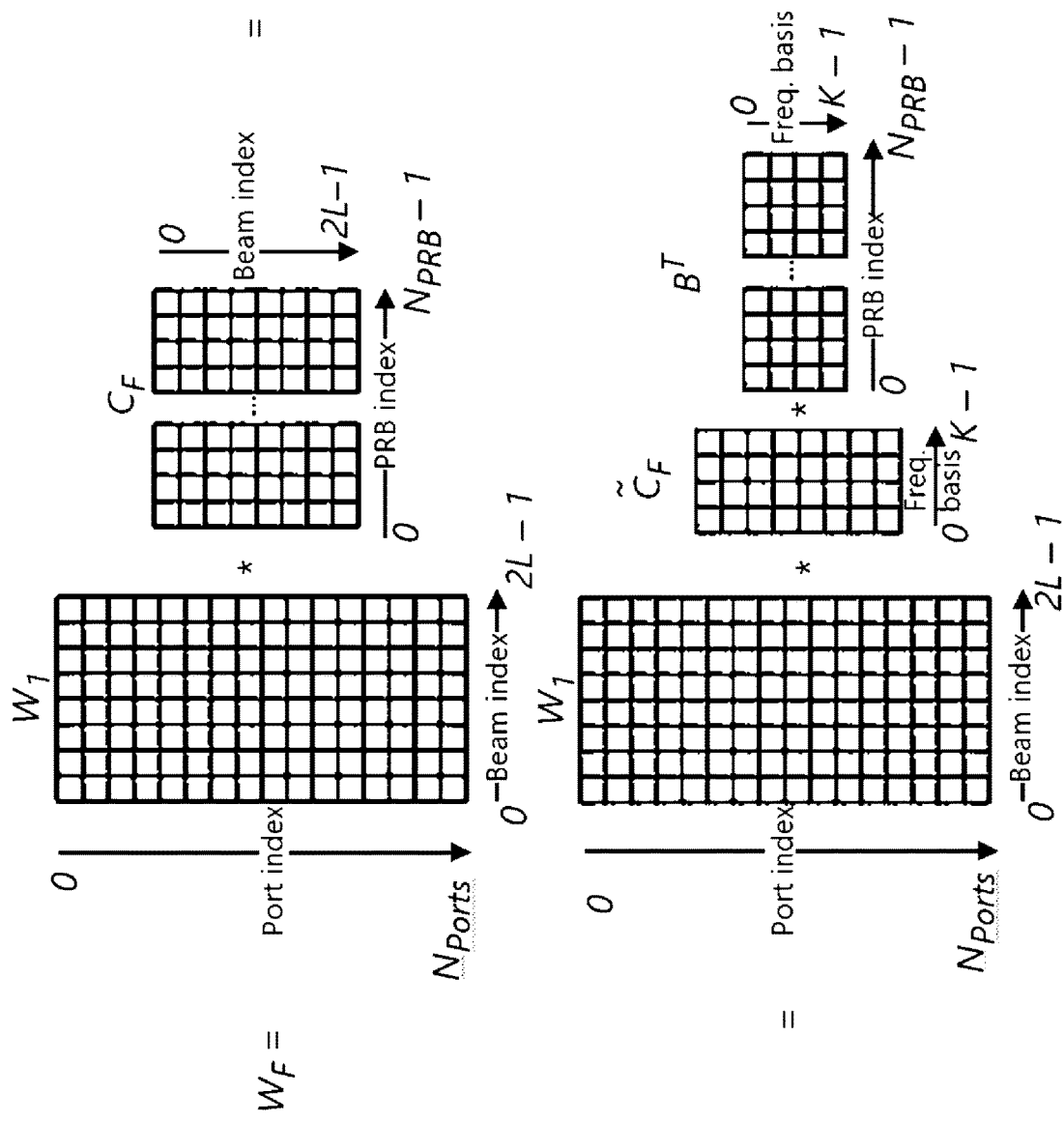
FIG. 4 illustrates a matrix representation of a Type II overhead reduction scheme, in accordance with certain embodiments.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Certain embodiments of the present disclosure utilize the fact that the number of propagation paths in a channel that is illuminated by different spatial-domain beams may be different. If a certain spatial-domain beam illuminates many propagation paths of the channel, it is likely that these propagation paths experience a wide range of different delays, and one can talk about the intra-beam delay spread as large. This implies, in the frequency-domain, that the channel of that spatial-domain beam is more frequency-selective than the channel of another spatial-domain beam that illuminates fewer propagation paths of the channel. For the linear combination precoders discussed for NR Rel-16 Type II overhead reduction, the coefficients $c_{l,i}(k)$, $k=0, \ldots, N_{RB}$ for a spatial-domain component $i=0, \ldots, 2L-1$ can be expressed as $c_{l,i}(k) = \Sigma_{d=0}^{K-1} b_{k,d} a_{d,i}$, as described earlier (where the index for the layer, 1, is omitted for brevity) or equivalently $c_{l,i} = \Sigma_{d=0}^{K-1} b_d a_{d,i}$, implying that the coefficients for each spatial-domain component i are constructed from K frequency-domain basis vectors or components b. As each spatial domain component of the precoder corresponds to a spatial-domain beam in the generated antenna radiation pattern, it can be advantageous, given a fixed budget of feedback bits, to allocate a different number of frequency-domain basis vectors or components to each spatial-domain component. That is, $c_{l,i} = \Sigma_{d=0}^{K_i-1} b_d a_{d,i}$, where $\{K_0, \ldots, K_{2L-i}\}$ is the number of frequency-domain basis vectors or components allocated for each spatial-domain component. Each spatial-domain component is thus associated with a respective set of one or more frequency-domain components, and the number of frequency-domain components (e.g. $K_0$) associated with a first spatial-domain component may be larger than the number of frequency-domain components (e.g. $K_1$) associated with a second spatial-domain component. As each combination of spatial-domain component and frequency-domain component is associated with a linear combining coefficient $a_{d,i}$, this also implies that the number of linear combining coefficients associated with each beam can be different, and by implication, the portion of the available CSI feedback overhead allocated to describing each spatial domain component may be varied.

The examples below describe embodiments with a fixed allocation of $K_i$ and embodiments with a dynamic allocation of $K_i$. It should be noted that the embodiments are applicable both for the case where first a common frequency-domain basis set is selected from a candidate frequency-domain basis set as well as when the frequency-domain basis vectors are selected directly from a candidate frequency-domain basis set. That is, a set of candidate frequency-domain components common for all spatial-domain components (referred to as a common frequency-domain basis set above) can first be selected from a set of candidate frequency-domain components and a second selection of frequency domain components from this common set can then be made. Alternatively, the selection can be made directly from the set of candidate frequency-domain components (referred to as the candidate frequency-domain basis set above).

Fixed Allocation $K_i$

In some embodiments, the values for $K_i$ are determined using a predefined rule and may be fixed in the specification.

In one such embodiment, the values of $\{K_0, \ldots, K_{2L-1}\}$ are fixed such that the strongest spatial-domain component (or beam) would use a larger number of frequency-domain basis vectors or components than a weaker spatial-domain component (or beam). This may imply that $K_0 \geq K_1 \geq \ldots \geq K_{2L-1}$ if we assume, without loss of generality, that the K-values are arranged in an order corresponding to strongest to weakest spatial domain component. "Strongest beam" may in some embodiments refer to a reported amplitude parameter or coefficient associated with the beam, such as the wideband amplitude parameter or coefficient $p_{l,i}^{(1)}$, i.e. a first beam associated with a first amplitude coefficient is said to be stronger than a second beam associated with a second amplitude coefficient when the first amplitude coefficient is larger than the second amplitude coefficient. If two beams have the same value for the amplitude coefficient, the ambiguity may be resolved using a fixed rule, such as a rule that the beam with the lowest index is given higher priority.

In another embodiment, the values of $\{K_0, \ldots, K_{2L-1}\}$ are dependent on the CSI reporting bandwidth, hence the number of PRBs used.

Furthermore, in order to enable higher rank CSI, the values of $\{K_0, \ldots, K_{2L-1}\}$ will in one embodiment be rank-dependent. Thus, $K_i$ may be written as $K_i(r)$ where r is the rank of the precoder. In one embodiment, $K_i(1) \geq K_i(2) \ldots \geq K_i(R_{max})$, with $R_{max}$ being the maximal supported rank of the codebook. This implies that a higher number of basis vectors would be used for the case of low rank than for the case of high rank. This is an appealing property since it counteracts the effect that the amount of feedback overhead increases with the rank.

In yet another embodiment $K_i$ is also made layer dependent so that it is replaced with $K_i(l)$.

In yet another embodiment $K_i = K_{i+L}$ implying that the two polarizations use the same number of basis vectors.

Dynamic Allocation of $K_i$

In another set of embodiments, there is a condition so that $\Sigma_{i=0}^{2L-1} K_i = K_{TOT}$ or alternatively $\Sigma_{i=1}^{2L-1} K_i \leq K_{TOT}$, meaning that the UE is able to dynamically allocate the number of basis vectors that a given beam should use from a budget of a total number of basis vectors $K_{TOT}$. In addition to this, conditions like $K_i > 0$ and/or $K_i < K_{max}$ may also exist for some value $K_{max}$. It should be noted that in such an embodiment the UE would need to signal back the choices of $K_i$. Hence, the UE will encode the selection of $K_i$, i=0, ..., 2L−1 by using a number of bits, and then signal this to the gNB. This signaling may be contained in CSI Part 1, which is separately encoded from a CSI Part 2 which comprise the selected beams (or spatial-domain components), basis vectors (or frequency domain components), and linear combination coefficients. In some embodiments, the selection of $K_i$ is explicitly encoded as a field in the CSI report. This explicit encoding may either be a joint encoding of all $K_i$ values, or, independent encoding of each $K_i$ value. In other embodiments, the encoding may be implicit such that the $K_i$ values can indirectly be derived from another parameter. In yet another embodiment, the $K_i$ values are jointly encoded with the selection of basis vectors $b_d$.

In order to enable higher rank CSI $K_{TOT}$ may be a function of rank as $K_{TOT}(r)$.

In yet another embodiment the concept of $K_{TOT}$ is extended to instead constitute a budget of basis vectors over both beams and layers. Hence, $\Sigma_{i=0}^{2L-1} \Sigma_{l=1}^{r} K_i(l) = K_{TOT}$.

In some embodiments, the effect that the time-domain sparsity of the channel is more static than the fast-fading properties is utilized and the $K_i$ values are transmitted in a separate report with longer periodicity.

Figure 5:
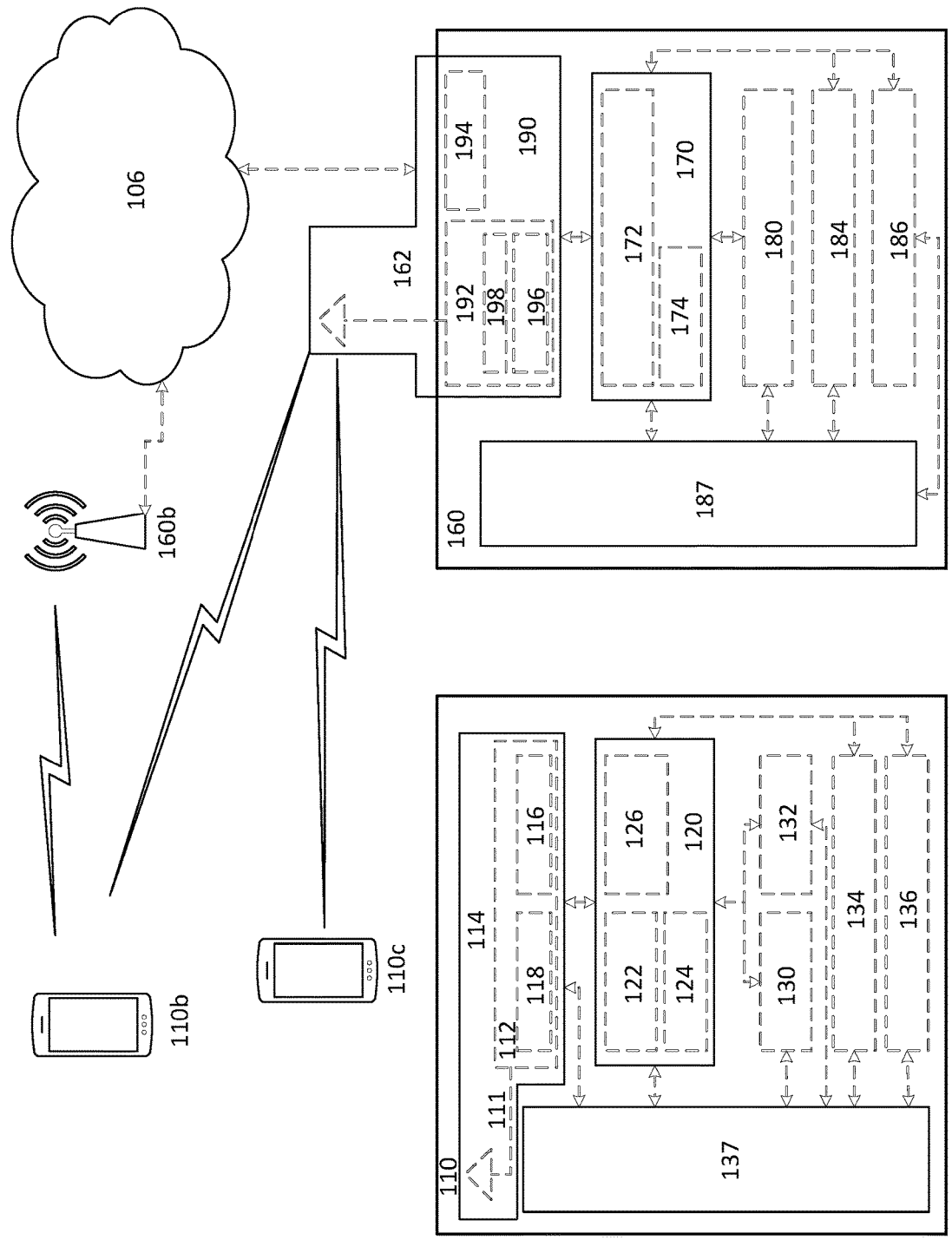
FIG. 5 illustrates an example wireless network, in accordance with certain embodiments.

Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 106, network nodes 160 and 160b, and wireless devices 110, 110b, and 110c. In practice, a wireless network may further include any additional elements suitable to support communication between wireless devices or between a wireless device and another communication device, such as a landline telephone, a service provider, or any other network node or end device. Of the illustrated components, network node 160 and wireless device 110 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 106 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 160 and wireless device 110 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multi-cast coordination entities (MCEs), core network nodes (e.g., MSCs, MMEs), O&M nodes, OSS nodes, SON nodes, positioning nodes (e.g., E-SMLCs), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 5, network node 160 includes processing circuitry 170, device readable medium 180, interface 190, auxiliary equipment 184, power source 186, power circuitry 187, and antenna 162. Although network node 160 illustrated in the example wireless network of FIG. 5 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 160 are depicted as single boxes located within a larger box, or nested within multiple boxes, in practice, a network node may comprise multiple different physical components that make up a single illustrated component (e.g., device readable medium 180 may comprise multiple separate hard drives as well as multiple RAM modules).

Similarly, network node 160 may be composed of multiple physically separate components (e.g., a NodeB component and a RNC component, or a BTS component and a BSC component, etc.), which may each have their own respective components. In certain scenarios in which network node 160 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 160 may be configured to support multiple radio access technologies (RATs). In such embodiments, some components may be duplicated (e.g., separate device readable medium 180 for the different RATs) and some components may be reused (e.g., the same antenna 162 may be shared by the RATs). Network node 160 may also include multiple sets of the various illustrated components for different wireless technologies integrated into network node 160, such as, for example, GSM, WCDMA, LTE, NR, WiFi, or Bluetooth wireless technologies. These wireless technologies may be integrated into the same or different chip or set of chips and other components within network node 160.

Processing circuitry 170 is configured to perform any determining, calculating, or similar operations (e.g., certain obtaining operations) described herein as being provided by a network node. These operations performed by processing circuitry 170 may include processing information obtained by processing circuitry 170 by, for example, converting the obtained information into other information, comparing the obtained information or converted information to information stored in the network node, and/or performing one or more operations based on the obtained information or converted information, and as a result of said processing making a determination.

Processing circuitry 170 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 160 components, such as device readable medium 180, network node 160 functionality. For example, processing circuitry 170 may execute instructions stored in device readable medium 180 or in memory within processing circuitry 170. Such functionality may include providing any of the various wireless features, functions, or benefits discussed herein. In some embodiments, processing circuitry 170 may include a system on a chip (SOC).

In some embodiments, processing circuitry 170 may include one or more of radio frequency (RF) transceiver circuitry 172 and baseband processing circuitry 174. In some embodiments, radio frequency (RF) transceiver circuitry 172 and baseband processing circuitry 174 may be on separate chips (or sets of chips), boards, or units, such as radio units and digital units. In alternative embodiments, part or all of RF transceiver circuitry 172 and baseband processing circuitry 174 may be on the same chip or set of chips, boards, or units In certain embodiments, some or all of the functionality described herein as being provided by a network node, base station, eNB or other such network device may be performed by processing circuitry 170 executing instructions stored on device readable medium 180 or memory within processing circuitry 170. In alternative embodiments, some or all of the functionality may be provided by processing circuitry 170 without executing instructions stored on a separate or discrete device readable medium, such as in a hard-wired manner. In any of those embodiments, whether executing instructions stored on a device readable storage medium or not, processing circuitry 170 can be configured to perform the described functionality. The benefits provided by such functionality are not limited to processing circuitry 170 alone or to other components of network node 160, but are enjoyed by network node 160 as a whole, and/or by end users and the wireless network generally.

Device readable medium 180 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 170. Device readable medium 180 may store any suitable instructions, data or information, including a computer program, software, an application including one or more of logic, rules, code, tables, etc. and/or other instructions capable of being executed by processing circuitry 170 and, utilized by network node 160. Device readable medium 180 may be used to store any calculations made by processing circuitry 170 and/or any data received via interface 190. In some embodiments, processing circuitry 170 and device readable medium 180 may be considered to be integrated.

Interface 190 is used in the wired or wireless communication of signalling and/or data between network node 160, network 106, and/or wireless devices 110. As illustrated, interface 190 comprises port(s)/terminal(s) 194 to send and receive data, for example to and from network 106 over a wired connection. Interface 190 also includes radio front end circuitry 192 that may be coupled to, or in certain embodiments a part of, antenna 162. Radio front end circuitry 192 comprises filters 198 and amplifiers 196. Radio front end circuitry 192 may be connected to antenna 162 and processing circuitry 170. Radio front end circuitry may be configured to condition signals communicated between antenna 162 and processing circuitry 170. Radio front end circuitry 192 may receive digital data that is to be sent out to other network nodes or wireless devices via a wireless connection. Radio front end circuitry 192 may convert the digital data into a radio signal having the appropriate channel and bandwidth parameters using a combination of filters 198 and/or amplifiers 196. The radio signal may then be transmitted via antenna 162. Similarly, when receiving data, antenna 162 may collect radio signals which are then converted into digital data by radio front end circuitry 192. The digital data may be passed to processing circuitry 170. In other embodiments, the interface may comprise different components and/or different combinations of components.

In certain alternative embodiments, network node 160 may not include separate radio front end circuitry 192, instead, processing circuitry 170 may comprise radio front end circuitry and may be connected to antenna 162 without separate radio front end circuitry 192. Similarly, in some embodiments, all or some of RF transceiver circuitry 172 may be considered a part of interface 190. In still other embodiments, interface 190 may include one or more ports or terminals 194, radio front end circuitry 192, and RF transceiver circuitry 172, as part of a radio unit (not shown), and interface 190 may communicate with baseband processing circuitry 174, which is part of a digital unit (not shown).

Antenna 162 may include one or more antennas, or antenna arrays, configured to send and/or receive wireless signals. Antenna 162 may be coupled to radio front end circuitry 190 and may be any type of antenna capable of transmitting and receiving data and/or signals wirelessly. In some embodiments, antenna 162 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 162 may be separate from network node 160 and may be connectable to network node 160 through an interface or port. Certain embodiments of the present disclosure may be used with two dimensional antenna arrays.

Antenna 162, interface 190, and/or processing circuitry 170 may be configured to perform any receiving operations and/or certain obtaining operations described herein as being performed by a network node. Any information, data and/or signals may be received from a wireless device, another network node and/or any other network equipment. Similarly, antenna 162, interface 190, and/or processing circuitry 170 may be configured to perform any transmitting operations described herein as being performed by a network node. Any information, data and/or signals may be transmitted to a wireless device, another network node and/or any other network equipment.

Power circuitry 187 may comprise, or be coupled to, power management circuitry and is configured to supply the components of network node 160 with power for performing the functionality described herein. Power circuitry 187 may receive power from power source 186. Power source 186 and/or power circuitry 187 may be configured to provide power to the various components of network node 160 in a form suitable for the respective components (e.g., at a voltage and current level needed for each respective component). Power source 186 may either be included in, or external to, power circuitry 187 and/or network node 160. For example, network node 160 may be connectable to an external power source (e.g., an electricity outlet) via an input circuitry or interface such as an electrical cable, whereby the external power source supplies power to power circuitry 187. As a further example, power source 186 may comprise a source of power in the form of a battery or battery pack which is connected to, or integrated in, power circuitry 187. The battery may provide backup power should the external power source fail. Other types of power sources, such as photovoltaic devices, may also be used.

Alternative embodiments of network node 160 may include additional components beyond those shown in FIG. 5 that may be responsible for providing certain aspects of the network node's functionality, including any of the functionality described herein and/or any functionality necessary to support the subject matter described herein. For example, network node 160 may include user interface equipment to allow input of information into network node 160 and to allow output of information from network node 160. This may allow a user to perform diagnostic, maintenance, repair, and other administrative functions for network node 160.

As used herein, wireless device (WD) refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE), a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 110 includes antenna 111, interface 114, processing circuitry 120, device readable medium 130, user interface equipment 132, auxiliary equipment 134, power source 136 and power circuitry 137. Wireless device 110 may include multiple sets of one or more of the illustrated components for different wireless technologies supported by wireless device 110, such as, for example, GSM, WCDMA, LTE, NR, WiFi, WiMAX, or Bluetooth wireless technologies, just to mention a few. These wireless technologies may be integrated into the same or different chips or set of chips as other components within wireless device 110.

Antenna 111 may include one or more antennas or antenna arrays, configured to send and/or receive wireless signals, and is connected to interface 114. In certain alternative embodiments, antenna 111 may be separate from wireless device 110 and be connectable to wireless device 110 through an interface or port. Antenna 111, interface 114, and/or processing circuitry 120 may be configured to perform any receiving or transmitting operations described herein as being performed by a wireless device. Any information, data and/or signals may be received from a network node and/or another wireless device. In some embodiments, radio front end circuitry and/or antenna 111 may be considered an interface. Certain embodiments of the present disclosure may be used with two dimensional antenna arrays.

As illustrated, interface 114 comprises radio front end circuitry 112 and antenna 111. Radio front end circuitry 112 comprise one or more filters 118 and amplifiers 116. Radio front end circuitry 114 is connected to antenna 111 and processing circuitry 120, and is configured to condition signals communicated between antenna 111 and processing circuitry 120. Radio front end circuitry 112 may be coupled to or a part of antenna 111. In some embodiments, wireless device 110 may not include separate radio front end circuitry 112; rather, processing circuitry 120 may comprise radio front end circuitry and may be connected to antenna 111. Similarly, in some embodiments, some or all of RF transceiver circuitry 122 may be considered a part of interface 114. Radio front end circuitry 112 may receive digital data that is to be sent out to other network nodes or wireless devices via a wireless connection. Radio front end circuitry 112 may convert the digital data into a radio signal having the appropriate channel and bandwidth parameters using a combination of filters 118 and/or amplifiers 116. The radio signal may then be transmitted via antenna 111. Similarly, when receiving data, antenna 111 may collect radio signals which are then converted into digital data by radio front end circuitry 112. The digital data may be passed to processing circuitry 120. In other embodiments, the interface may comprise different components and/or different combinations of components.

Processing circuitry 120 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 110 components, such as device readable medium 130, wireless device 110 functionality. Such functionality may include providing any of the various wireless features or benefits discussed herein. For example, processing circuitry 120 may execute instructions stored in device readable medium 130 or in memory within processing circuitry 120 to provide the functionality disclosed herein.

As illustrated, processing circuitry 120 includes one or more of RF transceiver circuitry 122, baseband processing circuitry 124, and application processing circuitry 126. In other embodiments, the processing circuitry may comprise different components and/or different combinations of components. In certain embodiments processing circuitry 120 of wireless device 110 may comprise a SOC. In some embodiments, RF transceiver circuitry 122, baseband processing circuitry 124, and application processing circuitry 126 may be on separate chips or sets of chips. In alternative embodiments, part or all of baseband processing circuitry 124 and application processing circuitry 126 may be combined into one chip or set of chips, and RF transceiver circuitry 122 may be on a separate chip or set of chips. In still alternative embodiments, part or all of RF transceiver circuitry 122 and baseband processing circuitry 124 may be on the same chip or set of chips, and application processing circuitry 126 may be on a separate chip or set of chips. In yet other alternative embodiments, part or all of RF transceiver circuitry 122, baseband processing circuitry 124, and application processing circuitry 126 may be combined in the same chip or set of chips. In some embodiments, RF transceiver circuitry 122 may be a part of interface 114. RF transceiver circuitry 122 may condition RF signals for processing circuitry 120.

In certain embodiments, some or all of the functionality described herein as being performed by a wireless device may be provided by processing circuitry 120 executing instructions stored on device readable medium 130, which in certain embodiments may be a computer-readable storage medium. In alternative embodiments, some or all of the functionality may be provided by processing circuitry 120 without executing instructions stored on a separate or discrete device readable storage medium, such as in a hardwired manner. In any of those particular embodiments, whether executing instructions stored on a device readable storage medium or not, processing circuitry 120 can be configured to perform the described functionality. The benefits provided by such functionality are not limited to processing circuitry 120 alone or to other components of wireless device 110, but are enjoyed by wireless device 110 as a whole, and/or by end users and the wireless network generally.

Processing circuitry 120 may be configured to perform any determining, calculating, or similar operations (e.g., certain obtaining operations) described herein as being performed by a wireless device. These operations, as performed by processing circuitry 120, may include processing information obtained by processing circuitry 120 by, for example, converting the obtained information into other information, comparing the obtained information or converted information to information stored by wireless device 110, and/or performing one or more operations based on the obtained information or converted information, and as a result of said processing making a determination.

Device readable medium 130 may be operable to store a computer program, software, an application including one or more of logic, rules, code, tables, etc. and/or other instructions capable of being executed by processing circuitry 120.

Device readable medium 130 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 120. In some embodiments, processing circuitry 120 and device readable medium 130 may be considered to be integrated.

User interface equipment 132 may provide components that allow for a human user to interact with wireless device 110. Such interaction may be of many forms, such as visual, audial, tactile, etc. User interface equipment 132 may be operable to produce output to the user and to allow the user to provide input to wireless device 110. The type of interaction may vary depending on the type of user interface equipment 132 installed in wireless device 110. For example, if wireless device 110 is a smart phone, the interaction may be via a touch screen; if wireless device 110 is a smart meter, the interaction may be through a screen that provides usage (e.g., the number of gallons used) or a speaker that provides an audible alert (e.g., if smoke is detected). User interface equipment 132 may include input interfaces, devices and circuits, and output interfaces, devices and circuits. User interface equipment 132 is configured to allow input of information into wireless device 110, and is connected to processing circuitry 120 to allow processing circuitry 120 to process the input information. User interface equipment 132 may include, for example, a microphone, a proximity or other sensor, keys/buttons, a touch display, one or more cameras, a USB port, or other input circuitry. User interface equipment 132 is also configured to allow output of information from wireless device 110, and to allow processing circuitry 120 to output information from wireless device 110. User interface equipment 132 may include, for example, a speaker, a display, vibrating circuitry, a USB port, a headphone interface, or other output circuitry. Using one or more input and output interfaces, devices, and circuits, of user interface equipment 132, wireless device 110 may communicate with end users and/or the wireless network, and allow them to benefit from the functionality described herein.

Auxiliary equipment 134 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 134 may vary depending on the embodiment and/or scenario.

Power source 136 may, in some embodiments, be in the form of a battery or battery pack. Other types of power sources, such as an external power source (e.g., an electricity outlet), photovoltaic devices or power cells, may also be used. Wireless device 110 may further comprise power circuitry 137 for delivering power from power source 136 to the various parts of wireless device 110 which need power from power source 136 to carry out any functionality described or indicated herein. Power circuitry 137 may in certain embodiments comprise power management circuitry. Power circuitry 137 may additionally or alternatively be operable to receive power from an external power source; in which case wireless device 110 may be connectable to the external power source (such as an electricity outlet) via input circuitry or an interface such as an electrical power cable.

Power circuitry 137 may also in certain embodiments be operable to deliver power from an external power source to power source 136. This may be, for example, for the charging of power source 136. Power circuitry 137 may perform any formatting, converting, or other modification to the power from power source 136 to make the power suitable for the respective components of wireless device 110 to which power is supplied.

Figure 6:
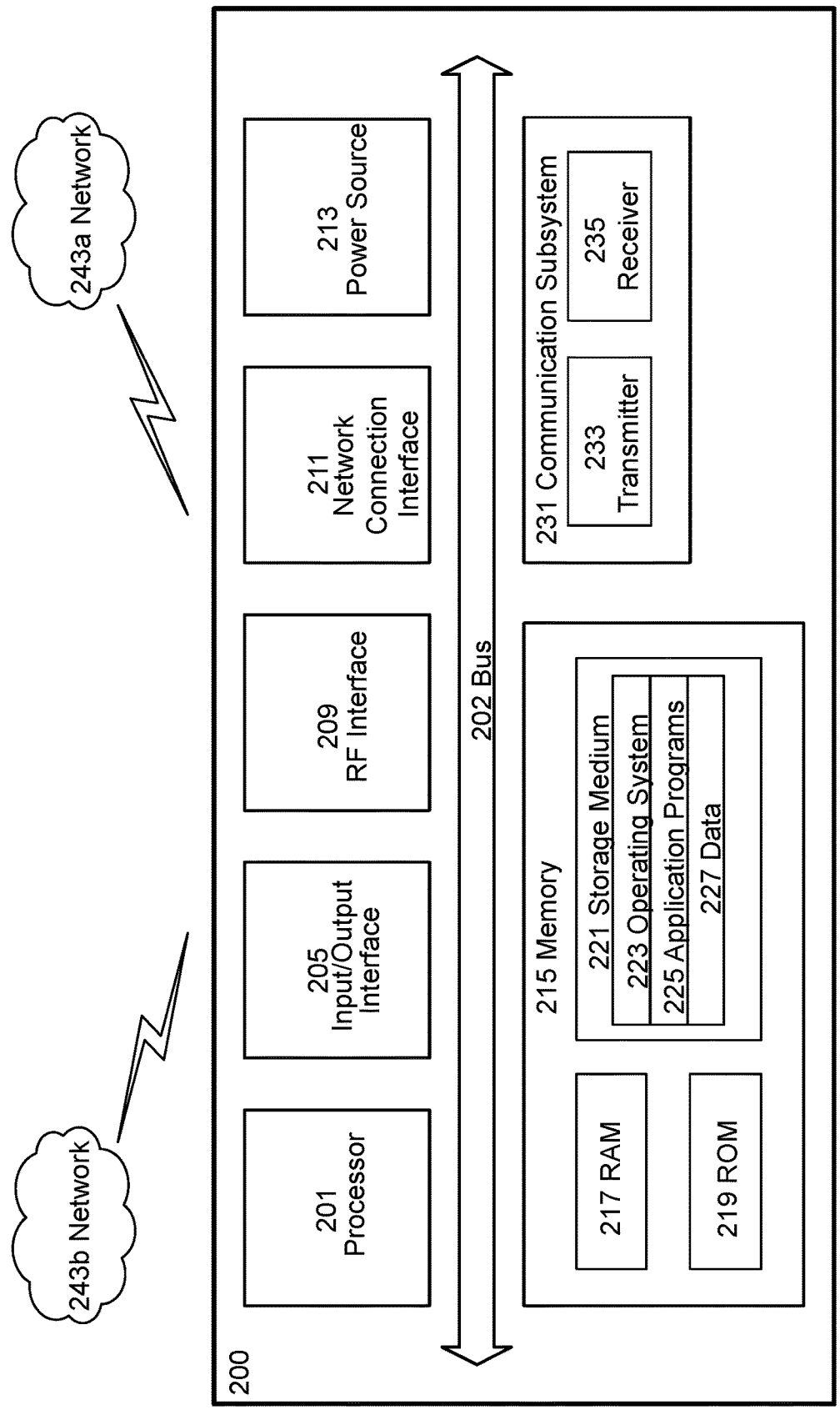
FIG. 6 illustrates an example user equipment, in accordance with certain embodiments.

FIG. 6 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 2200 may be any UE identified by the $3^{rd}$ Generation Partnership Project (3GPP), including a NB-IoT UE, a machine type communication (MTC) UE, and/or an enhanced MTC (eMTC) UE. UE 200, as illustrated in FIG. 6, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 6 is a UE, the components discussed herein are equally applicable to a wireless device, and vice-versa.

In FIG. 6, UE 200 includes processing circuitry 201 that is operatively coupled to input/output interface 205, radio frequency (RF) interface 209, network connection interface 211, memory 215 including random access memory (RAM) 217, read-only memory (ROM) 219, and storage medium 221 or the like, communication subsystem 231, power source 233, and/or any other component, or any combination thereof. Storage medium 221 includes operating system 223, application program 225, and data 227. In other embodiments, storage medium 221 may include other similar types of information. Certain UEs may utilize all of the components shown in FIG. 6, or only a subset of the components. The level of integration between the components may vary from one UE to another UE. Further, certain UEs may contain multiple instances of a component, such as multiple processors, memories, transceivers, transmitters, receivers, etc.

In FIG. 6, processing circuitry 201 may be configured to process computer instructions and data. Processing circuitry 201 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 201 may include two central processing units (CPUs). Data may be information in a form suitable for use by a computer.

In the depicted embodiment, input/output interface 205 may be configured to provide a communication interface to an input device, output device, or input and output device. UE 200 may be configured to use an output device via input/output interface 205. An output device may use the same type of interface port as an input device. For example, a USB port may be used to provide input to and output from UE 200. The output device may be a speaker, a sound card, a video card, a display, a monitor, a printer, an actuator, an emitter, a smartcard, another output device, or any combination thereof. UE 200 may be configured to use an input device via input/output interface 205 to allow a user to capture information into UE 200. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 6, RF interface 209 may be configured to provide a communication interface to RF components such as a transmitter, a receiver, and an antenna. Network connection interface 211 may be configured to provide a communication interface to network 243a. Network 243a may encompass wired and/or wireless networks such as a local-area network (LAN), a wide-area network (WAN), a computer network, a wireless network, a telecommunications network, another like network or any combination thereof. For example, network 243a may comprise a Wi-Fi network. Network connection interface 211 may be configured to include a receiver and a transmitter interface used to communicate with one or more other devices over a communication network according to one or more communication protocols, such as Ethernet, TCP/IP, SONET, ATM, or the like. Network connection interface 211 may implement receiver and transmitter functionality appropriate to the communication network links (e.g., optical, electrical, and the like). The transmitter and receiver functions may share circuit components, software or firmware, or alternatively may be implemented separately.

RAM 217 may be configured to interface via bus 202 to processing circuitry 201 to provide storage or caching of data or computer instructions during the execution of software programs such as the operating system, application programs, and device drivers. ROM 219 may be configured to provide computer instructions or data to processing circuitry 201. For example, ROM 219 may be configured to store invariant low-level system code or data for basic system functions such as basic input and output (I/O), startup, or reception of keystrokes from a keyboard that are stored in a non-volatile memory. Storage medium 221 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 221 may be configured to include operating system 223, application program 225 such as a web browser application, a widget or gadget engine or another application, and data file 227. Storage medium 221 may store, for use by UE 200, any of a variety of various operating systems or combinations of operating systems.

Storage medium 221 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 221 may allow UE 200 to access computer-executable instructions, application programs or the like, stored on transitory or non-transitory memory media, to off-load data, or to upload data. An article of manufacture, such as one utilizing a communication system may be tangibly embodied in storage medium 221, which may comprise a device readable medium.

In FIG. 6, processing circuitry 201 may be configured to communicate with network 243b using communication subsystem 231. Network 243a and network 243b may be the same network or networks or different network or networks. Communication subsystem 231 may be configured to include one or more transceivers used to communicate with network 243b. For example, communication subsystem 231 may be configured to include one or more transceivers used to communicate with one or more remote transceivers of another device capable of wireless communication such as another wireless device, UE, or base station of a radio access network (RAN) according to one or more communication protocols, such as IEEE 802.2, CDMA, WCDMA, GSM, LTE, UTRAN, WiMax, or the like. Each transceiver may include transmitter 233 and/or receiver 235 to implement transmitter or receiver functionality, respectively, appropriate to the RAN links (e.g., frequency allocations and the like). Further, transmitter 233 and receiver 235 of each transceiver may share circuit components, software or firmware, or alternatively may be implemented separately.

In the illustrated embodiment, the communication functions of communication subsystem 231 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 231 may include cellular communication, Wi-Fi communication, Bluetooth communication, and GPS communication. Network 243b may encompass wired and/or wireless networks such as a local-area network (LAN), a wide-area network (WAN), a computer network, a wireless network, a telecommunications network, another like network or any combination thereof. For example, network 243b may be a cellular network, a Wi-Fi network, and/or a near-field network. Power source 213 may be configured to provide alternating current (AC) or direct current (DC) power to components of UE 200.

The features, benefits and/or functions described herein may be implemented in one of the components of UE 200 or partitioned across multiple components of UE 200. Further, the features, benefits, and/or functions described herein may be implemented in any combination of hardware, software or firmware. In one example, communication subsystem 231 may be configured to include any of the components described herein. Further, processing circuitry 201 may be configured to communicate with any of such components over bus 202. In another example, any of such components may be represented by program instructions stored in memory that when executed by processing circuitry 201 perform the corresponding functions described herein. In another example, the functionality of any of such components may be partitioned between processing circuitry 201 and communication subsystem 231. In another example, the non-computationally intensive functions of any of such components may be implemented in software or firmware and the computationally intensive functions may be implemented in hardware.

Figure 7:
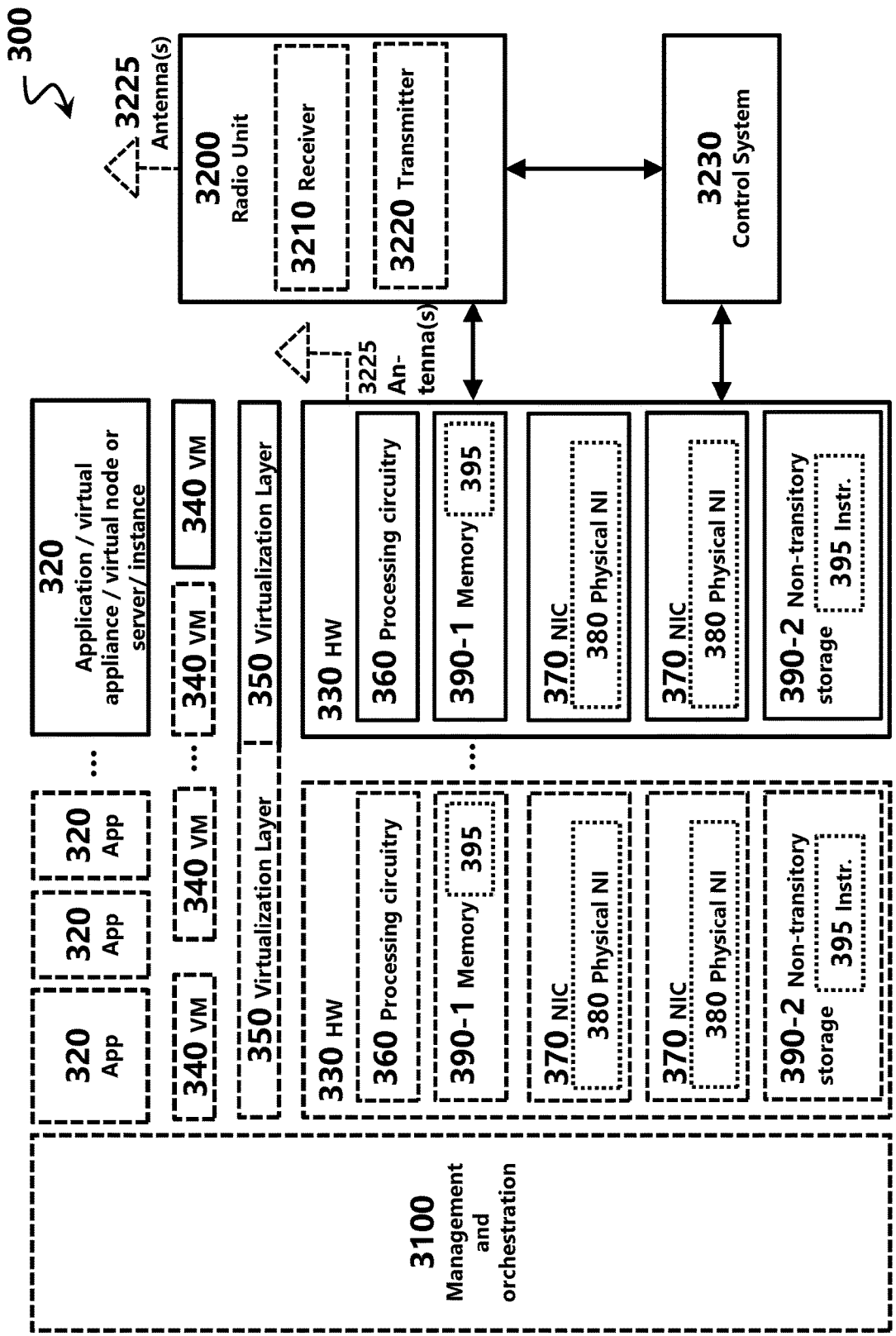
FIG. 7 illustrates an example virtualization environment, in accordance with certain embodiments.

FIG. 7 is a schematic block diagram illustrating a virtualization environment 300 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 300 hosted by one or more of hardware nodes 330. Further, in embodiments in which the virtual node is not a radio access node or does not require radio connectivity (e.g., a core network node), then the network node may be entirely virtualized.

The functions may be implemented by one or more applications 320 (which may alternatively be called software instances, virtual appliances, network functions, virtual nodes, virtual network functions, etc.) operative to implement some of the features, functions, and/or benefits of some of the embodiments disclosed herein. Applications 320 are run in virtualization environment 300 which provides hardware 330 comprising processing circuitry 360 and memory 390. Memory 390 contains instructions 395 executable by processing circuitry 360 whereby application 320 is operative to provide one or more of the features, benefits, and/or functions disclosed herein.

Virtualization environment 300, comprises general-purpose or special-purpose network hardware devices 330 comprising a set of one or more processors or processing circuitry 360, which may be commercial off-the-shelf (COTS) processors, dedicated Application Specific Integrated Circuits (ASICs), or any other type of processing circuitry including digital or analog hardware components or special purpose processors. Each hardware device may comprise memory 390-1 which may be non-persistent memory for temporarily storing instructions 395 or software executed by processing circuitry 360. Each hardware device may comprise one or more network interface controllers (NICs) 370, also known as network interface cards, which include physical network interface 380. Each hardware device may also include non-transitory, persistent, machine-readable storage media 390-2 having stored therein software 395 and/or instructions executable by processing circuitry 360. Software 395 may include any type of software including software for instantiating one or more virtualization layers 350 (also referred to as hypervisors), software to execute virtual machines 340 as well as software allowing it to execute functions, features and/or benefits described in relation with some embodiments described herein.

Virtual machines 340, comprise virtual processing, virtual memory, virtual networking or interface and virtual storage, and may be run by a corresponding virtualization layer 350 or hypervisor. Different embodiments of the instance of virtual appliance 320 may be implemented on one or more of virtual machines 340, and the implementations may be made in different ways.

During operation, processing circuitry 360 executes software 395 to instantiate the hypervisor or virtualization layer 350, which may sometimes be referred to as a virtual machine monitor (VMM). Virtualization layer 350 may present a virtual operating platform that appears like networking hardware to virtual machine 340.

As shown in FIG. 7, hardware 330 may be a standalone network node with generic or specific components. Hardware 330 may comprise antenna 3225 and may implement some functions via virtualization. Alternatively, hardware 330 may be part of a larger cluster of hardware (e.g. such as in a data center or customer premise equipment (CPE)) where many hardware nodes work together and are managed via management and orchestration (MANO) 3100, which, among others, oversees lifecycle management of applications 320.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 340 may be a software implementation of a physical machine that runs programs as if they were executing on a physical, non-virtualized machine. Each of virtual machines 340, and that part of hardware 330 that executes that virtual machine, be it hardware dedicated to that virtual machine and/or hardware shared by that virtual machine with others of the virtual machines 340, forms a separate virtual network elements (VNE).

Still in the context of NFV, Virtual Network Function (VNF) is responsible for handling specific network functions that run in one or more virtual machines 340 on top of hardware networking infrastructure 330 and corresponds to application 320 in FIG. 7.

In some embodiments, one or more radio units 3200 that each include one or more transmitters 3220 and one or more receivers 3210 may be coupled to one or more antennas 3225. Radio units 3200 may communicate directly with hardware nodes 330 via one or more appropriate network interfaces and may be used in combination with the virtual components to provide a virtual node with radio capabilities, such as a radio access node or a base station.

In some embodiments, some signalling can be effected with the use of control system 3230 which may alternatively be used for communication between the hardware nodes 330 and radio units 3200.

Figure 8:
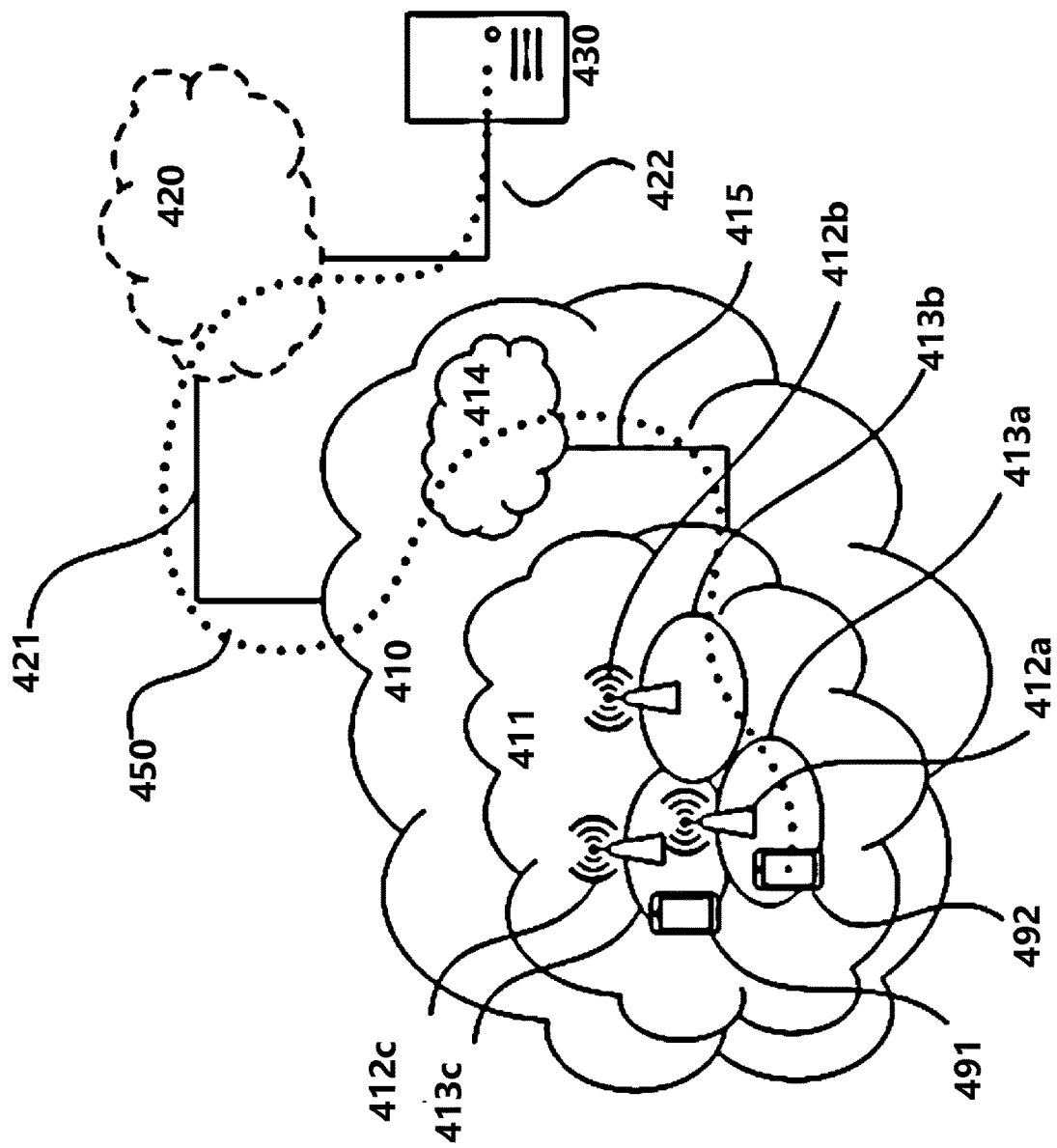
FIG. 8 illustrate an example telecommunication network connected via an intermediate network to a host computer, in accordance with certain embodiments.

With reference to FIG. 8, in accordance with an embodiment, a communication system includes telecommunication network 410, such as a 3GPP-type cellular network, which comprises access network 411, such as a radio access network, and core network 414. Access network 411 comprises a plurality of base stations 412*a*, 412*b*, 412*c*, such as NBs, eNBs, gNBs or other types of wireless access points, each defining a corresponding coverage area 413*a*, 413*b*, 413*c*. Each base station 412*a*, 412*b*, 412*c* is connectable to core network 414 over a wired or wireless connection 415. A first UE 491 located in coverage area 413*c* is configured to wirelessly connect to, or be paged by, the corresponding base station 412*c*. A second UE 492 in coverage area 413*a* is wirelessly connectable to the corresponding base station 412*a*. While a plurality of UEs 491, 492 are illustrated in this example, the disclosed embodiments are equally applicable to a situation where a sole UE is in the coverage area or where a sole UE is connecting to the corresponding base station 412.

Telecommunication network 410 is itself connected to host computer 430, which may be embodied in the hardware and/or software of a standalone server, a cloud-implemented server, a distributed server or as processing resources in a server farm. Host computer 430 may be under the ownership or control of a service provider, or may be operated by the service provider or on behalf of the service provider. Connections 421 and 422 between telecommunication network 410 and host computer 430 may extend directly from core network 414 to host computer 430 or may go via an optional intermediate network 420. Intermediate network 420 may be one of, or a combination of more than one of, a public, private or hosted network; intermediate network 420, if any, may be a backbone network or the Internet; in particular, intermediate network 420 may comprise two or more sub-networks (not shown).

The communication system of FIG. 8 as a whole enables connectivity between the connected UEs 491, 492 and host computer 430. The connectivity may be described as an over-the-top (OTT) connection 450. Host computer 430 and the connected UEs 491, 492 are configured to communicate data and/or signaling via OTT connection 450, using access network 411, core network 414, any intermediate network 420 and possible further infrastructure (not shown) as intermediaries. OTT connection 450 may be transparent in the sense that the participating communication devices through which OTT connection 450 passes are unaware of routing of uplink and downlink communications. For example, base station 412 may not or need not be informed about the past routing of an incoming downlink communication with data originating from host computer 430 to be forwarded (e.g., handed over) to a connected UE 491. Similarly, base station 412 need not be aware of the future routing of an outgoing uplink communication originating from the UE 491 towards the host computer 430.

Example implementations, in accordance with an embodiment, of the UE, base station and host computer discussed in the preceding paragraphs will now be described with reference to FIG. 9. In communication system 500, host computer 510 comprises hardware 515 including communication interface 516 configured to set up and maintain a wired or wireless connection with an interface of a different communication device of communication system 500. Host computer 510 further comprises processing circuitry 518, which may have storage and/or processing capabilities. In particular, processing circuitry 518 may comprise one or more programmable processors, application-specific integrated circuits, field programmable gate arrays or combinations of these (not shown) adapted to execute instructions. Host computer 510 further comprises software 511, which is stored in or accessible by host computer 510 and executable by processing circuitry 518. Software 511 includes host application 512. Host application 512 may be operable to provide a service to a remote user, such as UE 530 connecting via OTT connection 550 terminating at UE 530 and host computer 510. In providing the service to the remote user, host application 512 may provide user data which is transmitted using OTT connection 550.

Communication system 500 further includes base station 520 provided in a telecommunication system and comprising hardware 525 enabling it to communicate with host computer 510 and with UE 530. Hardware 525 may include communication interface 526 for setting up and maintaining a wired or wireless connection with an interface of a different communication device of communication system 500, as well as radio interface 527 for setting up and maintaining at least wireless connection 570 with UE 530 located in a coverage area (not shown in FIG. 9) served by base station 520. Communication interface 526 may be configured to facilitate connection 560 to host computer 510. Connection 560 may be direct or it may pass through a core network (not shown in FIG. 9) of the telecommunication system and/or through one or more intermediate networks outside the telecommunication system. In the embodiment shown, hardware 525 of base station 520 further includes processing circuitry 528, which may comprise one or more programmable processors, application-specific integrated circuits, field programmable gate arrays or combinations of these (not shown) adapted to execute instructions. Base station 520 further has software 521 stored internally or accessible via an external connection.

Communication system 500 further includes UE 530 already referred to. Its hardware 535 may include radio interface 537 configured to set up and maintain wireless connection 570 with a base station serving a coverage area in which UE 530 is currently located. Hardware 535 of UE 530 further includes processing circuitry 538, which may comprise one or more programmable processors, application-specific integrated circuits, field programmable gate arrays or combinations of these (not shown) adapted to execute instructions. UE 530 further comprises software 531, which is stored in or accessible by UE 530 and executable by processing circuitry 538. Software 531 includes client application 532. Client application 532 may be operable to provide a service to a human or non-human user via UE 530, with the support of host computer 510. In host computer 510, an executing host application 512 may communicate with the executing client application 532 via OTT connection 550 terminating at UE 530 and host computer 510. In providing the service to the user, client application 532 may receive request data from host application 512 and provide user data in response to the request data. OTT connection 550 may transfer both the request data and the user data. Client application 532 may interact with the user to generate the user data that it provides.

Figure 9:
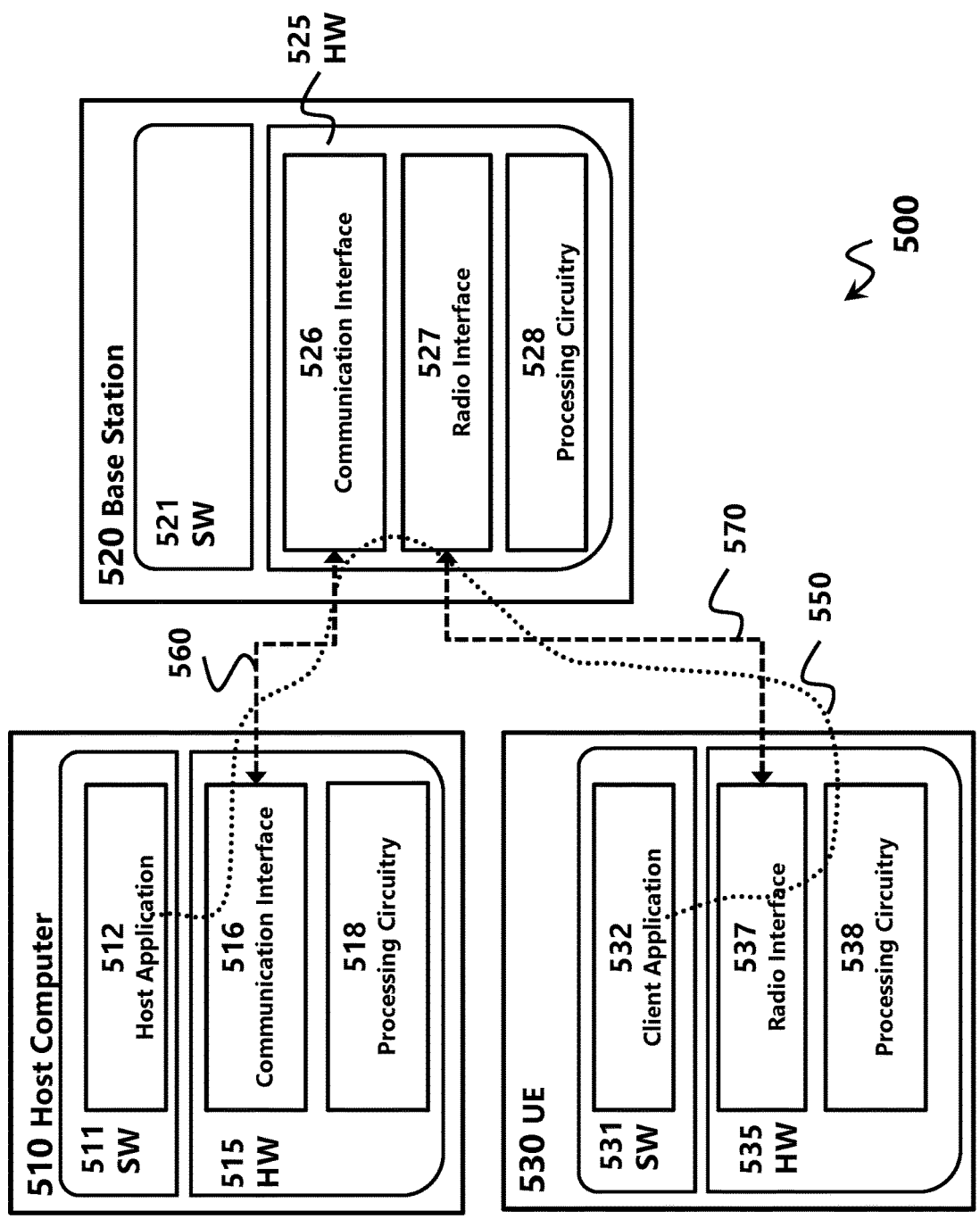
FIG. 9 illustrates an example host computer communicating via a base station with a user equipment over a partially wireless connection, in accordance with certain embodiments.

It is noted that host computer 510, base station 520 and UE 530 illustrated in FIG. 9 may be similar or identical to host computer 430, one of base stations 412*a*, 412*b*, 412*c* and one of UEs 491, 492 of FIG. 8, respectively. This is to say, the inner workings of these entities may be as shown in FIG. 9 and independently, the surrounding network topology may be that of FIG. 8.

In FIG. 9, OTT connection 550 has been drawn abstractly to illustrate the communication between host computer 510 and UE 530 via base station 520, without explicit reference to any intermediary devices and the precise routing of messages via these devices. Network infrastructure may determine the routing, which it may be configured to hide from UE 530 or from the service provider operating host computer 510, or both. While OTT connection 550 is active, the network infrastructure may further take decisions by which it dynamically changes the routing (e.g., on the basis of load balancing consideration or reconfiguration of the network).

Wireless connection 570 between UE 530 and base station 520 is in accordance with the teachings of the embodiments described throughout this disclosure. One or more of the various embodiments improve the performance of OTT services provided to UE 530 using OTT connection 550, in which wireless connection 570 forms the last segment. More precisely, the teachings of these embodiments may improve the data rate, latency, and/or power consumption and thereby provide benefits such as reduced user waiting time, better responsiveness, and/or extended battery lifetime.

A measurement procedure may be provided for the purpose of monitoring data rate, latency and other factors on which the one or more embodiments improve. There may further be an optional network functionality for reconfiguring OTT connection 550 between host computer 510 and UE 530, in response to variations in the measurement results. The measurement procedure and/or the network functionality for reconfiguring OTT connection 550 may be implemented in software 511 and hardware 515 of host computer 510 or in software 531 and hardware 535 of UE 530, or both. In embodiments, sensors (not shown) may be deployed in or in association with communication devices through which OTT connection 550 passes; the sensors may participate in the measurement procedure by supplying values of the monitored quantities exemplified above, or supplying values of other physical quantities from which software 511, 531 may compute or estimate the monitored quantities. The reconfiguring of OTT connection 550 may include message format, retransmission settings, preferred routing etc.; the reconfiguring need not affect base station 520, and it may be unknown or imperceptible to base station 520. Such procedures and functionalities may be known and practiced in the art. In certain embodiments, measurements may involve proprietary UE signaling facilitating host computer 510's measurements of throughput, propagation times, latency and the like. The measurements may be implemented in that software 511 and 531 causes messages to be transmitted, in particular empty or 'dummy' messages, using OTT connection 550 while it monitors propagation times, errors etc.

Figure 10:
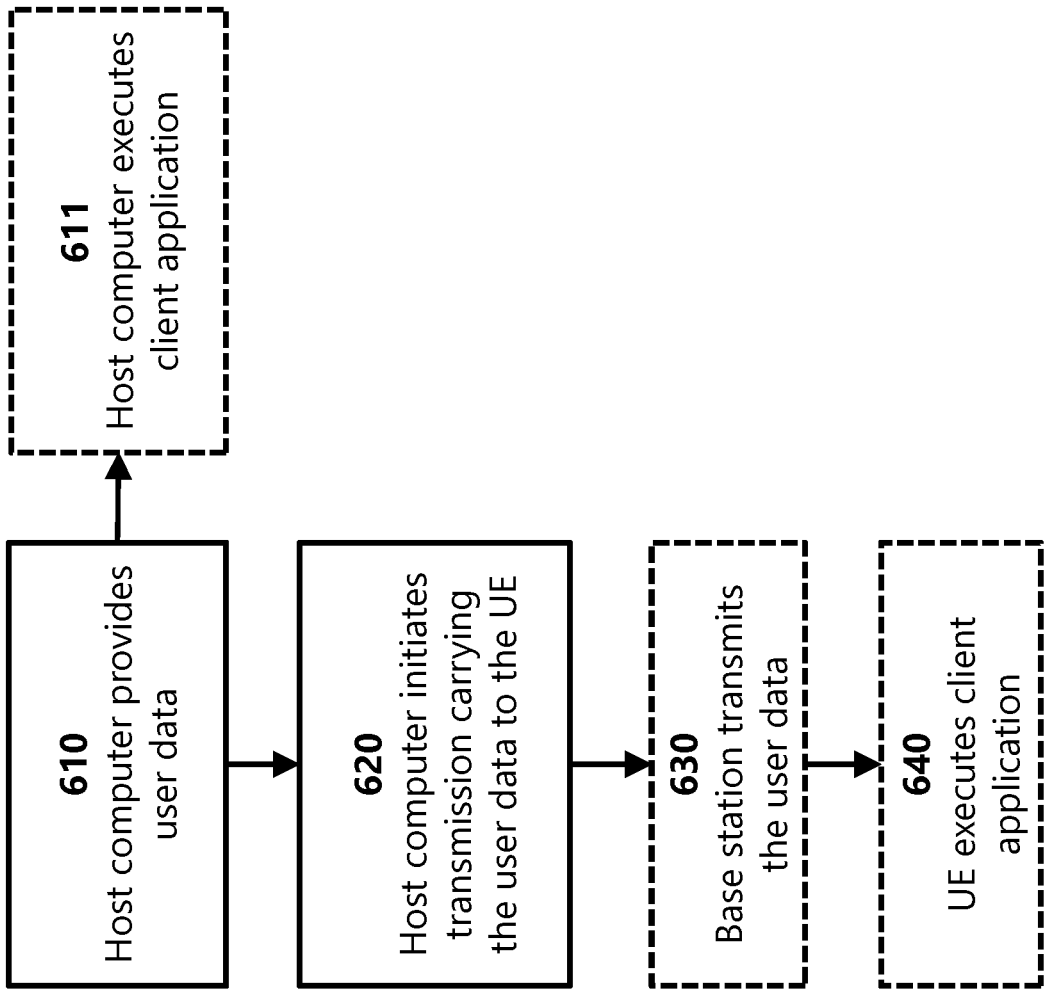
FIG. 10 is a flowchart illustrating an example method implemented in a communication system, in accordance certain embodiments.

FIG. 10 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 10 will be included in this section. In step 610, the host computer provides user data. In substep 611 (which may be optional) of step 610, the host computer provides the user data by executing a host application. In step 620, the host computer initiates a transmission carrying the user data to the UE. In step 630 (which may be optional), the base station transmits to the UE the user data which was carried in the transmission that the host computer initiated, in accordance with the teachings of the embodiments described throughout this disclosure. In step 640 (which may also be optional), the UE executes a client application associated with the host application executed by the host computer.

Figure 11:
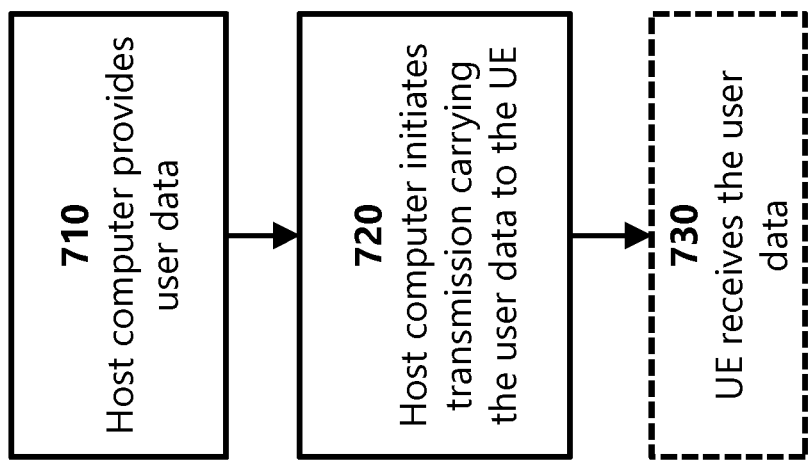
FIG. 11 is a flowchart illustrating a second example method implemented in a communication system, in accordance with certain embodiments.

FIG. 11 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 11 will be included in this section. In step 710 of the method, the host computer provides user data. In an optional substep (not shown) the host computer provides the user data by executing a host application. In step 720, the host computer initiates a transmission carrying the user data to the UE. The transmission may pass via the base station, in accordance with the teachings of the embodiments described throughout this disclosure. In step 730 (which may be optional), the UE receives the user data carried in the transmission.

Figure 12:
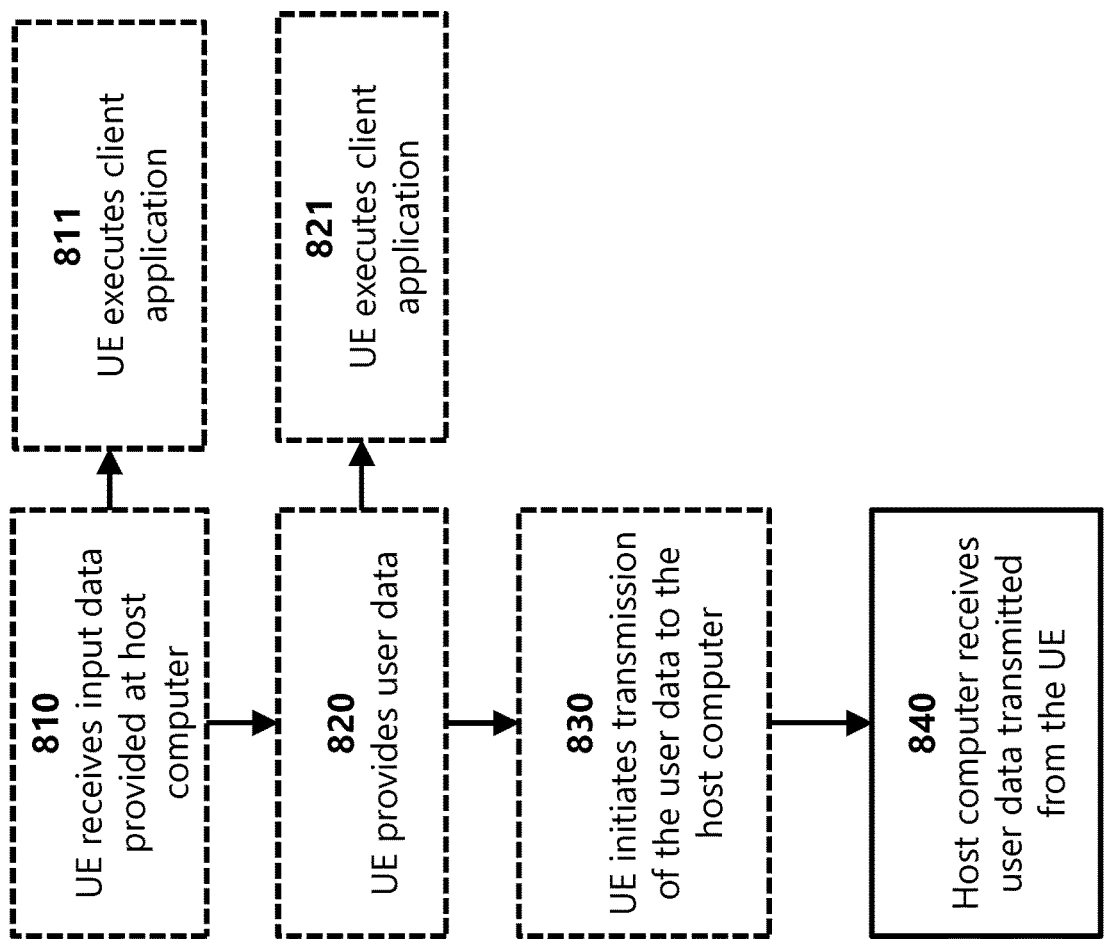
FIG. 12 is a flowchart illustrating a third method implemented in a communication system, in accordance with certain embodiments.

FIG. 12 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 12 will be included in this section. In step 810 (which may be optional), the UE receives input data provided by the host computer. Additionally or alternatively, in step 820, the UE provides user data. In substep 821 (which may be optional) of step 820, the UE provides the user data by executing a client application. In substep 811 (which may be optional) of step 810, the UE executes a client application which provides the user data in reaction to the received input data provided by the host computer. In providing the user data, the executed client application may further consider user input received from the user. Regardless of the specific manner in which the user data was provided, the UE initiates, in substep 830 (which may be optional), transmission of the user data to the host computer. In step 840 of the method, the host computer receives the user data transmitted from the UE, in accordance with the teachings of the embodiments described throughout this disclosure.

Figure 13:
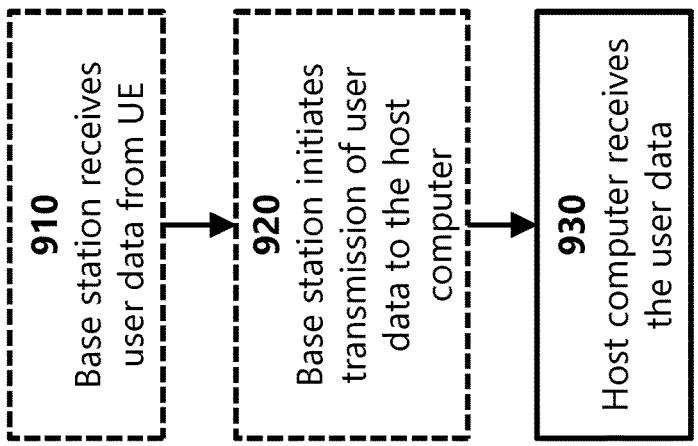
FIG. 13 is a flowchart illustrating a fourth method implemented in a communication system, in accordance with certain embodiments.

FIG. 13 is a flowchart illustrating a method implemented in a communication system, in accordance with one embodiment. The communication system includes a host computer, a base station and a UE which may be those described with reference to FIGS. 8 and 9. For simplicity of the present disclosure, only drawing references to FIG. 13 will be included in this section. In step 910 (which may be optional), in accordance with the teachings of the embodiments described throughout this disclosure, the base station receives user data from the UE. In step 920 (which may be optional), the base station initiates transmission of the received user data to the host computer. In step 930 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

Figure 14A:
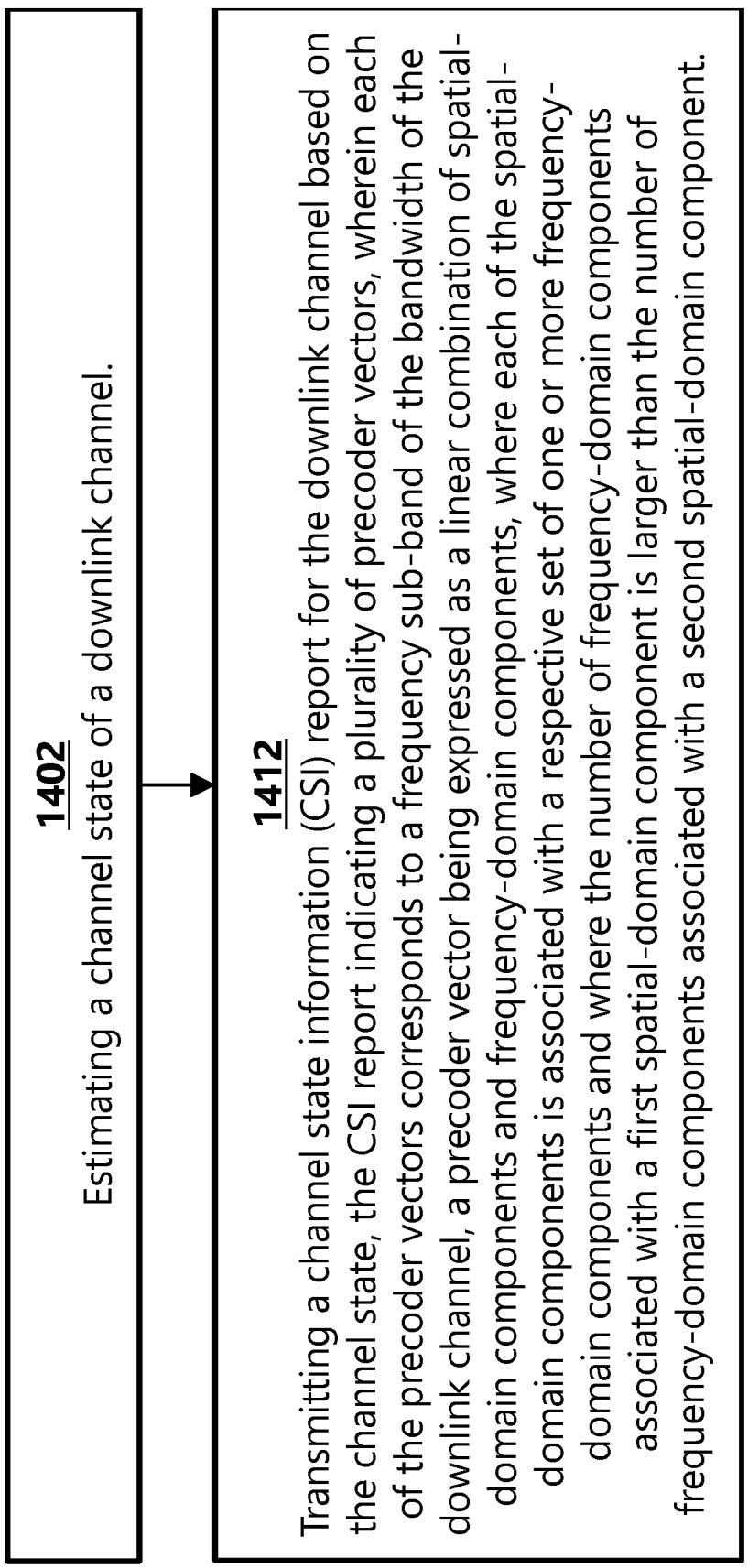
FIGS. 14A-14B are flowcharts illustrating an example of a method performed by a wireless device, in accordance with certain embodiments.

FIG. 14A depicts a method in accordance with particular embodiments. In some embodiments the method may be performed by a wireless device, such as wireless device 110 or UE 200 described above. The method begins at step 1402 with estimating a channel state of a downlink channel. In certain embodiments, the channel state of the downlink channel may be estimated based on measuring a downlink signal (e.g., CSI-RS). The method also comprises step 1412: transmitting a CSI report for the downlink channel based on the channel state. The CSI report indicates a plurality of precoder vectors, wherein each of the precoder vectors corresponds to a frequency sub-band of the bandwidth of the downlink channel, a precoder vector being expressed as a linear combination of spatial-domain components and frequency-domain components. Each of the spatial-domain components is associated with a respective set of one or more frequency-domain components and the number of frequency-domain components associated with a first spatial-domain component is larger than the number of frequency-domain components associated with a second spatial-domain component. As explained above, it can be advantageous (given a fixed budget of feedback bits in the CSI report) to allocate a different number of frequency domain components to different spatial-domain components. The reason is that this implies that the number of linear combining coefficients associated with the different spatial-domain components may be different which makes it possible to efficiently distribute the fixed budget of feedback bits between spatial-domain components such that "stronger" spatial-domain components are allocated a larger share of the fixed budget of feedback bits than "weaker" spatial-domain components.

Figure 14B:
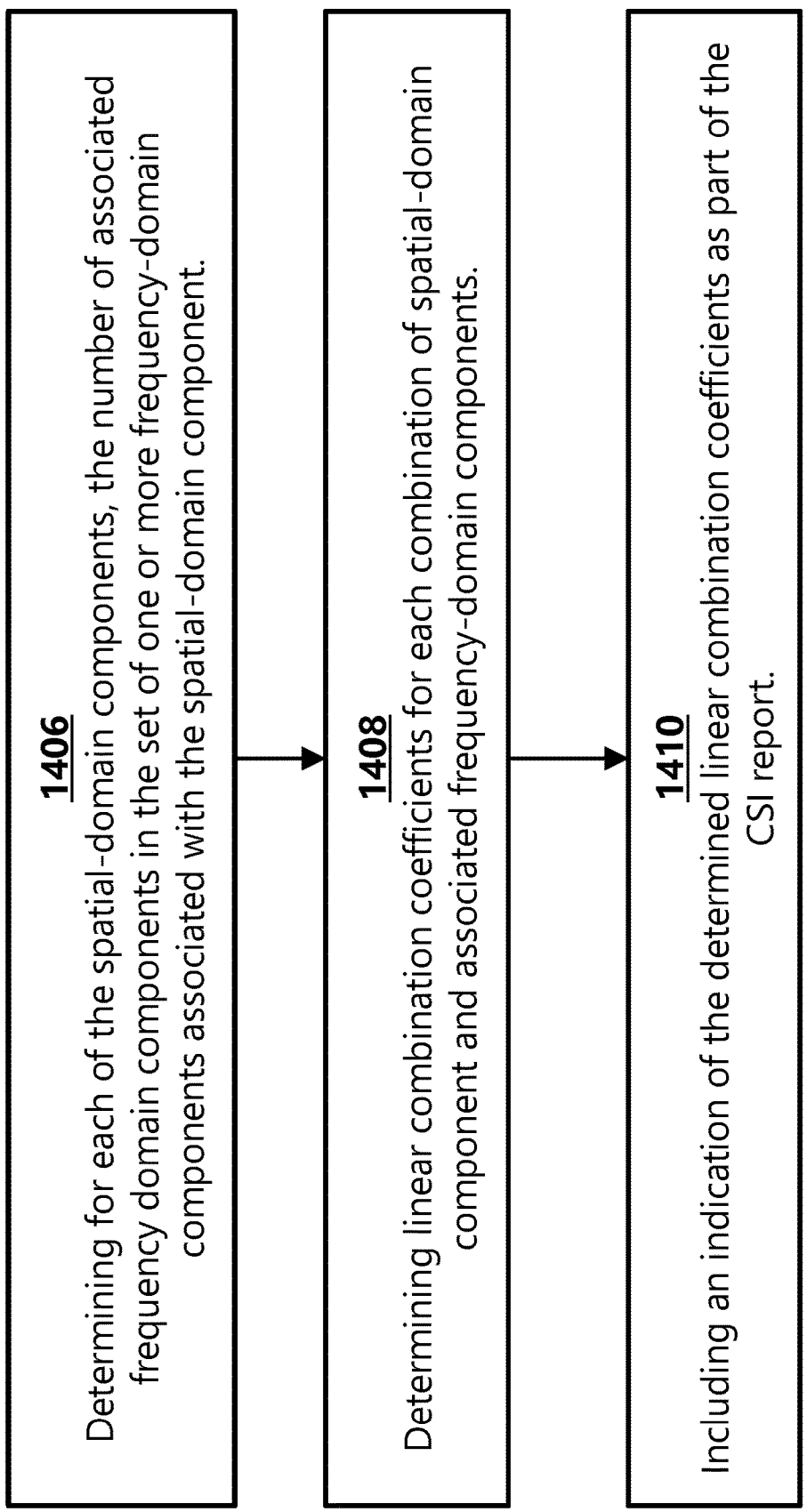

As illustrated in FIG. 14B, the method may further comprise step 1406, 1408, and 1410. In step 1406, the method comprises determining for each of the spatial-domain components, the number of associated frequency domain components in the set of one or more frequency-domain components associated with the spatial-domain component. In step 1408, the method proceeds with determining linear combination coefficients for each combination of spatial-domain component and associated frequency-domain components. If the number of frequency-domain components associated with the first spatial-domain component is larger than the number of frequency-domain components associated with the second spatial-domain component, the number of linear combination coefficients included in the CSI report for the first spatial-domain component may be larger than the number of linear combination coefficients included in the CSI report for the second spatial-domain component. In step 1410, the method continues with including an indication of the determined linear combination coefficients as part of the CSI report, transmitted in step 1412 of FIG. 14A. For example, the CSI report may be transmitted to a base station. In certain embodiments, transmitting the CSI report to the base station may enable the base station to determine a precoding to use for transmitting data to the wireless device. In embodiments, the CSI report may comprise an indication of the number of associated frequency-domain components ($K_i$) for each spatial-domain component. The CSI report may additionally or alternatively comprise an indication of the associated frequency-domain components for each of the spatial-domain components.

Figure 15:
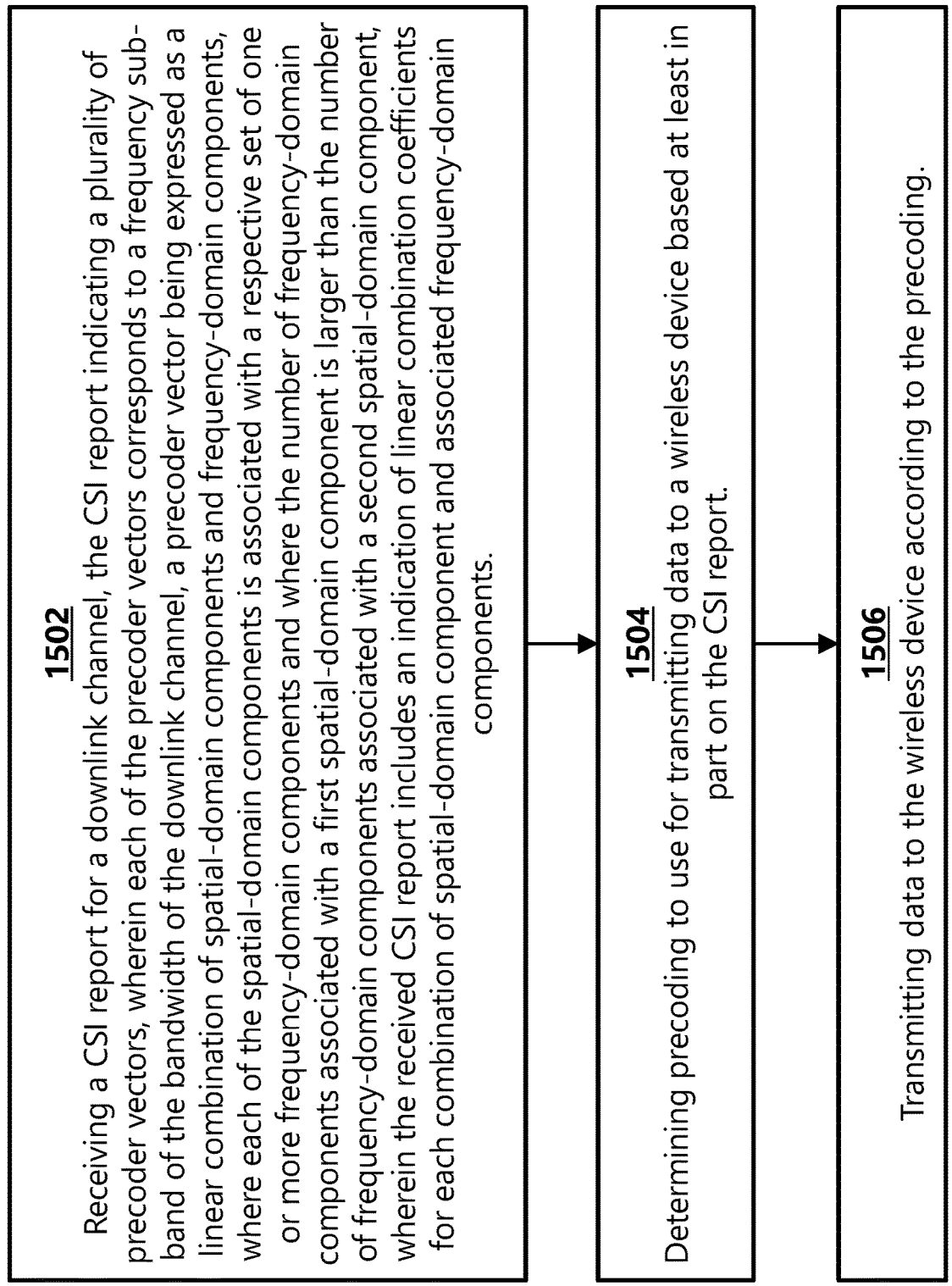
FIG. 15 is a flowchart illustrating an example of a method performed by a base station, in accordance with certain embodiments.

FIG. 15 depicts a method in accordance with particular embodiments. In some embodiments the method may be performed by a base station, such as network node 160 described above. The method begins at step 1502 with receiving a CSI report for a downlink channel. The CSI report indicates a plurality of precoder vectors. Each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components. The number of frequency-domain components associated with a first spatial-domain component is larger than the number of frequency-domain components associated with a second spatial-domain component. The received CSI report includes an indication of linear combination coefficients for each combination of spatial-domain component and associated frequency-domain components. The method proceeds to step 1504 with determining precoding to use for transmitting data to a wireless device. The precoding is determined based at least in part on the CSI report received in step 1502. The method continues to step 1506 with transmitting data to the wireless device according to the precoding.

Figure 16:
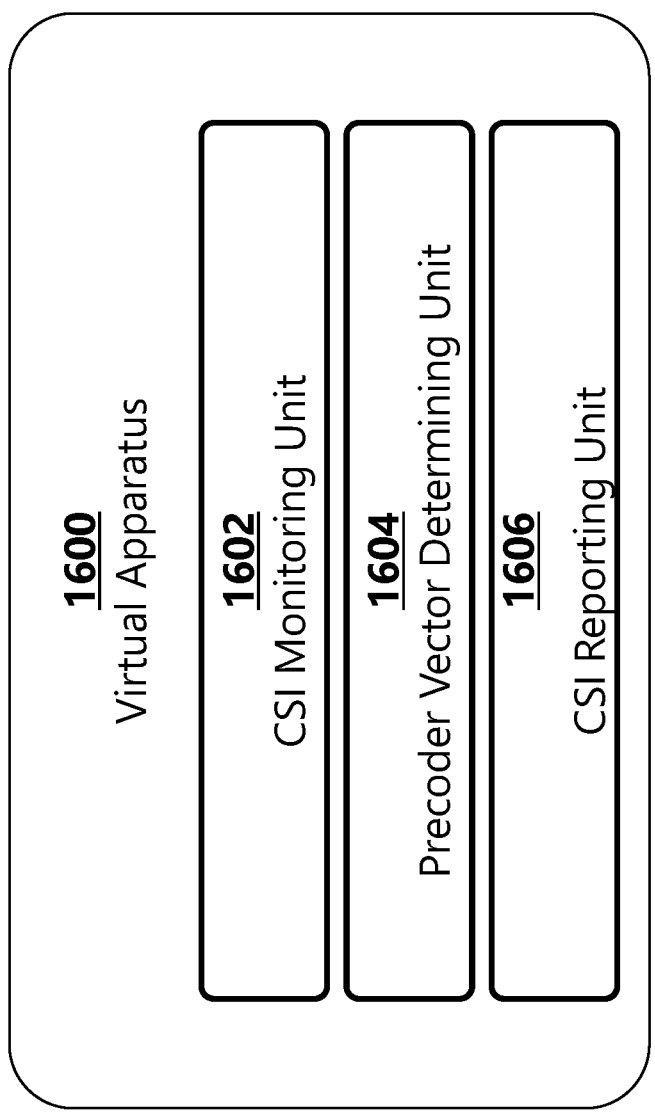
FIG. 16 is a block diagram illustrating an example of a virtual apparatus, in accordance with certain embodiments.

FIG. 16 illustrates a schematic block diagram of an apparatus 1600 in a wireless network (for example, the wireless network shown in FIG. 5). The apparatus may be implemented in a wireless device (e.g., wireless device 110 shown in FIG. 5). Apparatus 1600 is operable to carry out the example method described with reference to FIGS. 14A-14B and possibly any other processes or methods disclosed herein. It is also to be understood that the method of FIGS. 14A-14B is not necessarily carried out solely by apparatus 1600. At least some operations of the method can be performed by one or more other entities.

Virtual Apparatus 1600 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to CSI Monitoring Unit 1602, Precoder Vector Determining Unit 1604, CSI Reporting Unit 1606, and any other suitable units of apparatus 1600 to perform corresponding functions according one or more embodiments of the present disclosure.

As illustrated in FIG. 16, apparatus 1600 includes CSI Monitoring Unit 1602, Precoder Vector Determining Unit 1604, and CSI Reporting Unit 1606. CSI Monitoring Unit 1602 monitors a state of a channel. For example, CSI Monitoring Unit 1602 may perform measurements of a downlink channel that indicate the state of the downlink channel. In certain embodiments, CSI Monitoring Unit 1602 estimates the channel state of the downlink channel based on the monitoring. Precoder Vector Determining Unit 1604 determines an indication of a plurality of precoder vectors recommended for use by a network node based on the state of the channel. For example, Precoder Vector Determining Unit 1604 may determine an indication as described in FIG. 14B. CSI Reporting Unit 1606 transmits a CSI Report to a network node. The CSI Report includes the indication determined by Precoder Vector Determining Unit 1604.

The term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

EMBODIMENTS

Group A Embodiments

1. A method performed by a wireless device, the method comprising:
   estimating a channel state of a channel, and based on the channel state:
   transmitting a channel state information (CSI) report indicating a plurality of precoder vectors, wherein each precoder vector corresponds to a frequency sub-band and comprises linear combinations of spatial-domain components and frequency-domain components, where each of the spatial-domain components is associated with a respective set of frequency-domain components and where the number of frequency-domain components associated with a first spatial-domain component is larger than the number of frequency-domain components associated with a second spatial-domain component;
   wherein the method further comprises:
   determining, for each spatial-domain component, the number of associated frequency-domain components in the set;
   determining linear combination coefficients for each combination of spatial-domain component and associated frequency-domain components; and
   including an indication of the determined linear combination coefficients as part of the CSI report.

2. (Dynamic Ki) The method of embodiment 1, wherein the CSI Report further comprises an indication of the number of associated frequency-domain components for each spatial-domain component.

3. The method of any of embodiments 1-2, wherein the CSI Report further comprises an indication of the associated frequency-domain components for each spatial-domain component.

4. (Fixed Ki depending on beam strength) The method of embodiment 1, wherein a determined amplitude coefficient associated with the first spatial-domain component is larger than or equal to a determined amplitude coefficient associated with the second spatial-domain component.

5. The method of embodiment 2, where the indication of the number of associated frequency-domain components for each spatial-domain component is jointly encoded with an indication of a selection of frequency-domain components.

6. The method of any of embodiments 1-5, wherein the number of frequency-domain components corresponds to the number of non-zero linear combination coefficients for each combination of spatial-domain component and associated frequency-domain components.

7. The method of any of the previous embodiments, further comprising:
   providing user data; and
   forwarding the user data to a host computer via the transmission to the base station.

Group B Embodiments

8. A method performed by a base station, the method comprising:
   receiving a channel state information (CSI) report indicating a plurality of precoder vectors, wherein each precoder vector corresponds to a frequency sub-band and comprises linear combinations of spatial-domain components and frequency-domain components, where each of the spatial-domain components is associated with a respective set of frequency-domain components and where the number of frequency-domain components associated with a first spatial-domain component is larger than the number of frequency-domain components associated with a second spatial-domain component;
   determining precoding to use for transmitting data to the wireless device based at least in part on the CSI report; and
   transmitting data to the wireless device according to the precoding.
   wherein each spatial-domain component is associated with a respective number of frequency-domain components in the set, and wherein the received CSI report includes an indication of linear combination coefficients for each combination of spatial-domain component and associated frequency-domain components.

9. (Dynamic Ki) The method of embodiment 8, wherein the CSI Report further comprises an indication of the number of associated frequency-domain components for each spatial-domain component.

10. The method of any of embodiments 8-9, wherein the CSI Report further comprises an indication of the associated frequency-domain components for each spatial-domain component.

11. (Fixed Ki depending on beam strength) The method of embodiment 8, wherein an amplitude coefficient associated with the first spatial-domain component is larger than or equal to an amplitude coefficient associated with the second spatial-domain component.

12. The method of embodiment 9, where the indication of the number of associated frequency-domain components for each spatial-domain component is jointly encoded with an indication of a selection of frequency-domain components.

13. The method of any of embodiments 8-12, wherein the number of frequency-domain components corresponds to the number of non-zero linear combination coefficients for each combination of spatial-domain component and associated frequency-domain components.

14. The method of any of the previous embodiments, further comprising:
    obtaining user data; and
    forwarding the user data to a host computer or a wireless device.

Group C Embodiments

15. A wireless device, the wireless device comprising:
    processing circuitry configured to perform any of the steps of any of the Group A embodiments; and power supply circuitry configured to supply power to the wireless device.
16. A base station, the base station comprising:
processing circuitry configured to perform any of the steps of any of the Group B embodiments;
power supply circuitry configured to supply power to the base station.
17. A user equipment (UE), the UE comprising:
an antenna configured to send and receive wireless signals;
radio front-end circuitry connected to the antenna and to processing circuitry, and configured to condition signals communicated between the antenna and the processing circuitry;
the processing circuitry being configured to perform any of the steps of any of the Group A embodiments;
an input interface connected to the processing circuitry and configured to allow input of information into the UE to be processed by the processing circuitry;
an output interface connected to the processing circuitry and configured to output information from the UE that has been processed by the processing circuitry; and
a battery connected to the processing circuitry and configured to supply power to the UE.
18. A computer program, the computer program comprising instructions which when executed on a computer perform any of the steps of any of the Group A embodiments.
19. A computer program product comprising a computer program, the computer program comprising instructions which when executed on a computer perform any of the steps of any of the Group A embodiments.
20. A non-transitory computer-readable storage medium or carrier comprising a computer program, the computer program comprising instructions which when executed on a computer perform any of the steps of any of the Group A embodiments.
21. A computer program, the computer program comprising instructions which when executed on a computer perform any of the steps of any of the Group B embodiments.
22. A computer program product comprising a computer program, the computer program comprising instructions which when executed on a computer perform any of the steps of any of the Group B embodiments.
23. A non-transitory computer-readable storage medium or carrier comprising a computer program, the computer program comprising instructions which when executed on a computer perform any of the steps of any of the Group B embodiments.
24. A communication system including a host computer comprising:
processing circuitry configured to provide user data; and
a communication interface configured to forward the user data to a cellular network for transmission to a user equipment (UE),
wherein the cellular network comprises a base station having a radio interface and processing circuitry, the base station's processing circuitry configured to perform any of the steps of any of the Group B embodiments.
25. The communication system of the pervious embodiment further including the base station.
26. The communication system of the previous 2 embodiments, further including the UE, wherein the UE is configured to communicate with the base station.
27. The communication system of the previous 3 embodiments, wherein:
the processing circuitry of the host computer is configured to execute a host application, thereby providing the user data; and
the UE comprises processing circuitry configured to execute a client application associated with the host application.
28. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the base station performs any of the steps of any of the Group B embodiments.
29. The method of the previous embodiment, further comprising, at the base station, transmitting the user data.
30. The method of the previous 2 embodiments, wherein the user data is provided at the host computer by executing a host application, the method further comprising, at the UE, executing a client application associated with the host application.
31. A user equipment (UE) configured to communicate with a base station, the UE comprising a radio interface and processing circuitry configured to performs the of the previous 3 embodiments.
32. A communication system including a host computer comprising:
processing circuitry configured to provide user data; and
a communication interface configured to forward user data to a cellular network for transmission to a user equipment (UE),
wherein the UE comprises a radio interface and processing circuitry, the UE's components configured to perform any of the steps of any of the Group A embodiments.
33. The communication system of the previous embodiment, wherein the cellular network further includes a base station configured to communicate with the UE.
34. The communication system of the previous 2 embodiments, wherein:
the processing circuitry of the host computer is configured to execute a host application, thereby providing the user data; and
the UE's processing circuitry is configured to execute a client application associated with the host application.
35. A method implemented in a communication system including a host computer, a base station and a user equipment (UE), the method comprising:
at the host computer, providing user data; and
at the host computer, initiating a transmission carrying the user data to the UE via a cellular network comprising the base station, wherein the UE performs any of the steps of any of the Group A embodiments.
36. The method of the previous embodiment, further comprising at the UE, receiving the user data from the base station.

37. A communication system including a host computer comprising:
    communication interface configured to receive user data originating from a transmission from a user equipment (UE) to a base station,
    wherein the UE comprises a radio interface and processing circuitry, the UE's processing circuitry configured to perform any of the steps of any of the Group A embodiments.
38. The communication system of the previous embodiment, further including the UE.
39. The communication system of the previous 2 embodiments, further including the base station, wherein the base station comprises a radio interface configured to communicate with the UE and a communication interface configured to forward to the host computer the user data carried by a transmission from the UE to the base station.
40. The communication system of the previous 3 embodiments, wherein:
    the processing circuitry of the host computer is configured to execute a host application; and
    the UE's processing circuitry is configured to execute a client application associated with the host application, thereby providing the user data.
41. The communication system of the previous 4 embodiments, wherein:
    the processing circuitry of the host computer is configured to execute a host application, thereby providing request data; and
    the UE's processing circuitry is configured to execute a client application associated with the host application, thereby providing the user data in response to the request data.
42. A method implemented in a communication system including a host computer, a base station and a user equipment (UE), the method comprising:
    at the host computer, receiving user data transmitted to the base station from the UE, wherein the UE performs any of the steps of any of the Group A embodiments.
43. The method of the previous embodiment, further comprising, at the UE, providing the user data to the base station.
44. The method of the previous 2 embodiments, further comprising:
    at the UE, executing a client application, thereby providing the user data to be transmitted; and
    at the host computer, executing a host application associated with the client application.
45. The method of the previous 3 embodiments, further comprising:
    at the UE, executing a client application; and
    at the UE, receiving input data to the client application, the input data being provided at the host computer by executing a host application associated with the client application,
    wherein the user data to be transmitted is provided by the client application in response to the input data.
46. A communication system including a host computer comprising a communication interface configured to receive user data originating from a transmission from a user equipment (UE) to a base station, wherein the base station comprises a radio interface and processing circuitry, the base station's processing circuitry configured to perform any of the steps of any of the Group B embodiments.
47. The communication system of the previous embodiment further including the base station.
48. The communication system of the previous 2 embodiments, further including the UE, wherein the UE is configured to communicate with the base station.
49. The communication system of the previous 3 embodiments, wherein:
    the processing circuitry of the host computer is configured to execute a host application;
    the UE is configured to execute a client application associated with the host application, thereby providing the user data to be received by the host computer.
50. A method implemented in a communication system including a host computer, a base station and a user equipment (UE), the method comprising:
    at the host computer, receiving, from the base station, user data originating from a transmission which the base station has received from the UE, wherein the UE performs any of the steps of any of the Group A embodiments.
51. The method of the previous embodiment, further comprising at the base station, receiving the user data from the UE.
52. The method of the previous 2 embodiments, further comprising at the base station, initiating a transmission of the received user data to the host computer.

Modifications, additions, or omissions may be made to the systems and apparatuses described herein without departing from the scope of the disclosure. The components of the systems and apparatuses may be integrated or separated. Moreover, the operations of the systems and apparatuses may be performed by more, fewer, or other components. Additionally, operations of the systems and apparatuses may be performed using any suitable logic comprising software, hardware, and/or other logic. As used in this document, "each" refers to each member of a set or each member of a subset of a set.

Modifications, additions, or omissions may be made to the methods described herein without departing from the scope of the disclosure. The methods may include more, fewer, or other steps. Additionally, steps may be performed in any suitable order.

Although this disclosure has been described in terms of certain embodiments, alterations and permutations of the embodiments will be apparent to those skilled in the art. Accordingly, the above description of the embodiments does not constrain this disclosure. Other changes, substitutions, and alterations are possible without departing from the spirit and scope of this disclosure, as defined by the following claims.

The invention claimed is:
1. A method performed by a wireless device, the method comprising:
    estimating a channel state of a downlink channel; and
    transmitting a channel state information report for the downlink channel based on the channel state, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components and where the number of frequency-domain components associated with a first spatial-domain component is larger than the number of frequency-domain components associated with a second spatial-domain component;

wherein the method further comprises:

determining, for each spatial-domain component of the spatial-domain components, which one or more frequency-domain components from a set of candidate frequency-domain components to be associated with that spatial-domain component;

determining a linear combination coefficients for each combination of spatial-domain component and an associated frequency-domain component; and including an indication of the determined linear combination coefficients as part of the CSI report.

2. The method of claim 1, wherein the number of linear combination coefficients included in the CSI report for the first spatial-domain component is larger than the number of linear combination coefficients included in the CSI report for the second spatial-domain component.

3. The method of claim 1, wherein the CSI report further comprises an indication of the number of associated frequency-domain components for each spatial-domain component.

4. The method of claim 1, wherein the CSI report further comprises an indication of the associated frequency-domain components for each of the spatial-domain components.

5. The method of claim 3, where the indication of the number of associated frequency-domain components for each of the spatial-domain components is jointly encoded with a selection of the one or more frequency-domain components associated with that spatial-domain component from the set of candidate frequency-domain components.

6. A method performed by a base station, the method comprising:

receiving a channel state information (CSI) report for a downlink channel, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components and where the number of frequency-domain components associated with a first spatial-domain component is larger than the number of frequency-domain components associated with a second spatial-domain component, wherein the received CSI report includes an indication of linear combination coefficients for each combination of spatial-domain component and associated frequency-domain components;

determining precoding to use for transmitting data to a wireless device based at least in part on the CSI report; and transmitting data to the wireless device according to the precoding.

7. The method of claim 6, wherein the number of linear combination coefficients received in the CSI report for the first spatial-domain component is larger than the number of linear combination coefficients received in the CSI report for the second spatial-domain component.

8. The method of claim 6, wherein the CSI report further comprises an indication of the number of associated frequency-domain components for each spatial-domain component.

9. The method of claim 6, wherein the CSI report further comprises an indication of the associated frequency-domain components for each of the spatial-domain components.

10. The method of claim 8, where the indication of the number of associated frequency-domain components for each of the spatial-domain components is jointly encoded with a selection of the one or more frequency-domain components associated with that spatial-domain component from a set of candidate frequency-domain components.

11. A wireless device comprising:

power supply circuitry configured to supply power to the wireless device; and processing circuitry configured to:

estimate a channel state of a downlink channel; and transmit a channel state information (CSI) report for the downlink channel based on the channel state, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components and where the number of frequency-domain components associated with a first spatial-domain component is larger than the number of frequency-domain components associated with a second spatial-domain component;

wherein the processing circuitry is further configured to:

determine, for each of the spatial-domain components, which one or more frequency-domain components from a set of candidate frequency-domain components to be associated with that spatial-domain component;

determine a linear combination coefficient for each combination of a spatial-domain component and an associated frequency-domain component; and include an indication of the determined linear combination coefficients as part of the CSI report.

12. The wireless device of claim 11, wherein the number of linear combination coefficients included in the CSI report for the first spatial-domain component is larger than the number of linear combination coefficients included in the CSI report for the second spatial-domain component.

13. The wireless device of claim 11, wherein the CSI report further comprises an indication of the number of associated frequency-domain components for each spatial-domain component.

14. The wireless device of claim 11, wherein the CSI report further comprises an indication of the associated frequency-domain components for each of the spatial-domain components.

15. The wireless device of claim 13, where the indication of the number of associated frequency-domain components for each of the spatial-domain components is jointly encoded with a selection of the one or more frequency-domain components associated with that spatial-domain component from the set of candidate frequency-domain components.

16. A base station comprising:

power supply circuitry configured to supply power to the base station; and processing circuitry configured to:

receive a channel state information report for a downlink channel, the CSI report indicating a plurality of precoder vectors, wherein each of the precoder vectors corresponds to a frequency sub-band of the bandwidth of the downlink channel, a precoder vector being expressed as a linear combination of spatial-domain components and frequency-domain components, where each of the spatial-domain components is associated with a respective set of one or more frequency-domain components and where the number of frequency-domain components associated with a first spatial-domain component is larger than the number of frequency-domain components associated with a second spatial-domain component, wherein the received CSI report includes an indication of linear combination coefficients for each combination of spatial-domain component and associated frequency-domain components;

determine precoding to use for transmitting data to a wireless device based at least in part on the CSI report; and transmit data to the wireless device according to the precoding.

17. The base station of claim 16, wherein the number of linear combination coefficients received in the CSI report for the first spatial-domain component is larger than the number of linear combination coefficients received in the CSI report for the second spatial-domain component.

18. The base station of claim 16, wherein the CSI report further comprises an indication of the number of associated frequency-domain components for each spatial-domain component.

19. The base station of claim 16, wherein the CSI report further comprises an indication of the associated frequency-domain components for each of the spatial-domain components.

20. The base station of claim 18, where the indication of the number of associated frequency-domain components for each of the spatial-domain components is jointly encoded with a selection of the one or more frequency-domain components associated with that spatial-domain component from the set of candidate frequency-domain components.

* * * * *

UNITED STATES PATENT AND TRADEMARK OFFICE
CERTIFICATE OF CORRECTION

PATENT NO. : 11,349,542 B2
APPLICATION NO. : 17/290026
DATED : May 31, 2022
INVENTOR(S) : Wernersson et al.

It is certified that error appears in the above-identified patent and that said Letters Patent is hereby corrected as shown below:

On the Title Page

In Item (57), under "ABSTRACT", in Column 2, Line 9, delete "component" and insert -- components --, therefor.

In Item (57), under "ABSTRACT", in Column 2, Lines 11-12, delete "determining" and insert -- determining, --, therefor.

On Page 2, in Item (56), under "OTHER PUBLICATIONS", in Column 1, Line 1, delete "#94b;" and insert -- #94bis; --, therefor.

In the Specification

In Column 2, Line 6, delete "$N_R$ DL," and insert -- NR DL, --, therefor.

In Column 4, in Equation, Line 45, delete "$W_{2D,DP}=[w_{2D,DP}(k_1,l_1,\phi 1)w_{2D,DP}(k_2 l_2,\phi_2) \ldots w_{2D,DP}(k_R,l_R\phi_R)],$" and insert -- $W_{2D,DP} = [w_{2D,DP}(k_1,l_1,\phi_1) w_{2D,DP}(k_2,l_2,\phi_2) \cdots w_{2D,DP}(k_R,l_R,\phi_R)],$ --, therefor.

In Column 4, Line 57, delete "$N_R$" and insert -- NR --, therefor.

Signed and Sealed this
Twenty-eighth Day of March, 2023

Katherine Kelly Vidal
*Director of the United States Patent and Trademark Office*

CERTIFICATE OF CORRECTION (continued)
U.S. Pat. No. 11,349,542 B2

In Column 5, in Equation, Lines 34-42, delete $$W^l_{q_1,q_2,n_1,n_2,p_l^{(1)},p_l^{(2)},c_l} = \frac{1}{\sqrt{N_1 N_2 \sum_{i=0}^{2L-1}(p_{l,i}^{(1)} p_{l,i}^{(2)})^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(11)} p_{l,i+L}^{(2)} \varphi_{l,i+L} \end{bmatrix} l = 1, 2$$

" and insert $$W^l_{q_1,q_2,n_1,n_2,p_l^{(1)},p_l^{(2)},c_l} = \frac{1}{\sqrt{N_1 N_2 \sum_{i=0}^{2L-1}\left(p_{l,i}^{(1)} p_{l,i}^{(2)}\right)^2}} \begin{bmatrix} \sum_{i=0}^{L-1} v_{m_1^{(i)},m_2^{(i)}} p_{l,i}^{(1)} p_{l,i}^{(2)} \varphi_{l,i} \\ \sum_{i=0}^{L-1} v_{m_1^{(i)},m_2^{(i)}} p_{l,i+L}^{(1)} p_{l,i+L}^{(2)} \varphi_{l,i+L} \end{bmatrix}, l = 1, 2$$

--, therefor.

In Column 6, Line 1, delete "$c_u(k)$" and insert -- $c_{1,i}(k)$ --, therefor.

In Column 6, Lines 2-3, delete "$p_{l,i}^{(2)}(0), \ldots p_{l,i}^{(2)}(N_{SB}-1)$" and insert -- $p_{l,i}^{(2)}(0), \ldots, p_{l,i}^{(2)}(N_{SB}-1)$ --, therefor.

In Column 6, Line 3, delete "$q_{l,i}(0), \ldots q_{l,i}(N_{SB}-1),$" and insert -- $\varphi_{l,i}(0), \ldots, \varphi_{l,i}(N_{SB}-1)$, --, therefor.

In Column 6, Line 44, delete "$f(k, a_0, \ldots, a_{M-1})$" and insert -- $f(k, \alpha_0, \ldots, \alpha_{M-1})$ --, therefor.

In Column 6, Line 45, delete "parameters $a_0, a_{M-1},$" and insert -- parameters $\alpha_0, \alpha_{M-1},$ --, therefor.

In Column 6, Line 49, delete "$f(k, a_0, \ldots, a_{M-1})$" and insert -- $f(k, \alpha_0, \ldots, \alpha_{M-1})$ --, therefor.

In Column 7, in Equation, Lines 15-17, delete $$c_{l,i}(k) = f(k, I, a_0, \ldots, a_{K-1}) = [B]_{k,:} a = \sum_{d=0}^{K-1} b_{k,d} a_d.$$

" and insert $$c_{l,i}(k) = f(k, I, a_0, \ldots, a_{K-1}) = [B]_{k,:} a = \sum_{d=0}^{K-1} b_{k,d} a_d.$$

--, therefor.

In Column 7, in Equation, Line 55, delete "$W_F = W_1 C_F = W_1 \tilde{C}_F B^T$" and insert -- $W_F = W_1 C_F = W_1 \tilde{C}_F B^T$. --, therefor.

In Column 11, Line 1, delete "illustrate" and insert -- illustrates --, therefor.

In Column 11, Line 10, delete "certain" and insert -- with certain --, therefor.

In Column 12, Line 4, delete "$c_{l,i}(k) = \Sigma_{d=0}^{K-1} b_{k,d} a_{d,i},$" and insert -- $c_{l,i}(k) = \Sigma_{d=0}^{K-1} b_{k,d} a_{d,i}$ --, therefor.

In Column 12, Line 15, delete "$\{K_0, \ldots, K_{2L-i}\}$" and insert -- $\{K_0, \ldots, K_{2L-1}\}$ --, therefor.

In Column 13, Line 1, delete "$\{K_0, \ldots, K_{2L-1}\}$" and insert -- $\{K_0, \ldots, K_{2L-1}\}$ --, therefor.

CERTIFICATE OF CORRECTION (continued)
U.S. Pat. No. 11,349,542 B2

In Column 13, Line 5, delete "$\{K_0, \ldots, K_{2L-1}\}$" and insert -- $\{K_0, \ldots, K_{2L-1}\}$ --, therefor.

In Column 13, Line 8, delete "$K_i(2)$" and insert -- $K_i(2) \geq$ --, therefor.

In Column 13, Line 15, delete "$K_i(1)$." and insert -- $K_i(1)$. --, therefor.

In Column 13, Line 20, delete "$\Sigma_{i=0}^{2L-1} K_i = K_{TOT}$" and insert -- $\Sigma_{i=0}^{2L-1} K_i = K_{TOT}$, --, therefor.

In Column 13, Line 20, delete "$\Sigma_{i=1}^{2L-1} K_i \leq K_{TOT}$," and insert -- $\Sigma_{i=0}^{2L-1} K_i \leq K_{TOT}$, --, therefor.

In Column 13, Line 26, delete "$K_1$." and insert -- $K_i$. --, therefor.

In Column 13, Line 27, delete "$K_1$," and insert -- $K_i$, --, therefor.

In Column 16, Line 8, delete "(SOC)." and insert -- (SoC). --, therefor.

In Column 16, Line 18, delete "units" and insert -- units. --, therefor.

In Column 17, Line 31, delete "circuitry 190" and insert -- circuitry 192 --, therefor.

In Column 19, Line 40, delete "circuitry 114" and insert -- circuitry 112 --, therefor.

In Column 20, Line 16, delete "SOC." and insert -- SoC. --, therefor.

In Column 22, Line 29, delete "interchangeable." and insert -- interchangeably. --, therefor.

In Column 22, Lines 38-39, delete "power source 233," and insert -- transmitter 233, --, therefor.

In Column 24, Line 10, delete "(SIM/RUIM) module," and insert -- module (SIM/RUIM), --, therefor.

In Column 25, Lines 40-41, delete "memory 390. Memory 390" and insert -- memory 390-1. Memory 390-1 --, therefor.

In Column 29, Line 31, delete "computer 510's" and insert -- computer's 510 --, therefor.

In Column 30, Line 20, delete "substep 830" and insert -- step 830 --, therefor.

In Column 30, Line 46, delete "microprocessor" and insert -- microprocessors --, therefor.

In Column 30, Line 60, delete "according one" and insert -- according to one --, therefor.

In Column 31, Line 28, delete "step" and insert -- steps --, therefor.

In Column 32, Line 28, delete "microprocessor" and insert -- microprocessors --, therefor.
In Column 32, Line 41, delete "to" and insert -- in --, therefor.

CERTIFICATE OF CORRECTION (continued)
U.S. Pat. No. 11,349,542 B2

In Column 32, Line 44, delete "according one" and insert -- according to one --, therefor.

In Column 33, Line 8, delete "and which" and insert -- and --, therefor.

In Column 34, Line 27, delete "precoding." and insert -- precoding; --, therefor.

In Column 35, Line 66, delete "pervious" and insert -- previous --, therefor.

In the Claims

In Column 38, Line 56, in Claim 1, delete "information report" and insert -- information (CSI) report --, therefor.

In Column 40, Line 64, in Claim 16, delete "information report" and insert -- information (CSI) report --, therefor.